US009031540B2

(12) United States Patent
Mathews

(10) Patent No.: US 9,031,540 B2
(45) Date of Patent: May 12, 2015

(54) AUTOMATICATION OF A USER TRANSACTION BASED UPON SCANNED WIRELESS SIGNALS

(71) Applicant: Newaer Inc., Los Angeles, CA (US)

(72) Inventor: David K Mathews, Malibu, CA (US)

(73) Assignee: Newaer Inc., Los Angeles, CA (US)

( * ) Notice: Subject to any disclaimer, the term of this patent is extended or adjusted under 35 U.S.C. 154(b) by 289 days.

(21) Appl. No.: 13/756,429

(22) Filed: Jan. 31, 2013

(65) Prior Publication Data

US 2013/0189953 A1 Jul. 25, 2013

Related U.S. Application Data

(63) Continuation-in-part of application No. 13/464,442, filed on May 4, 2012, now Pat. No. 8,577,354.

(60) Provisional application No. 61/544,370, filed on Oct. 7, 2011, provisional application No. 61/592,778, filed on Jan. 31, 2012.

(51) Int. Cl.
*H04M 1/68* (2006.01)
*H04W 12/06* (2009.01)
*H04L 12/28* (2006.01)
*H04M 3/00* (2006.01)
*H04L 29/06* (2006.01)
*H04W 8/00* (2009.01)
*H04W 4/02* (2009.01)
*G01S 5/02* (2010.01)

(52) U.S. Cl.
CPC ............... *H04W 12/06* (2013.01); *H04L 12/28* (2013.01); *H04M 3/00* (2013.01); *H04W 8/005* (2013.01); *H04L 63/0876* (2013.01); *H04W 4/025* (2013.01); *G01S 5/0252* (2013.01)

(58) Field of Classification Search
CPC .... H04W 4/025; H04W 12/06; G01S 5/0252; H04L 63/0876
USPC ................................................. 455/411, 456.1
See application file for complete search history.

(56) References Cited

U.S. PATENT DOCUMENTS

| 2008/0022115 A1 | 1/2008 | Mock et al. |
| 2010/0240343 A1 | 9/2010 | Russell |
| 2011/0269479 A1 | 11/2011 | Ledlie |
| 2011/0306354 A1 | 12/2011 | Ledlie |
| 2012/0033658 A1 | 2/2012 | Ganesan |
| 2012/0040653 A1* | 2/2012 | Mendis ...................... 455/414.2 |
| 2012/0072106 A1 | 3/2012 | Han et al. |
| 2012/0134282 A1 | 5/2012 | Tirronen et al. |
| 2012/0146761 A1 | 6/2012 | De Clerq et al. |
| 2012/0172027 A1 | 7/2012 | Partheesh et al. |
| 2012/0244885 A1* | 9/2012 | Hefetz ........................ 455/456.2 |
| 2013/0079031 A1* | 3/2013 | Kuhn et al. ................ 455/456.1 |
| 2013/0173474 A1* | 7/2013 | Ranganathan et al. ......... 705/67 |
| 2014/0006191 A1* | 1/2014 | Shankar et al. ................. 705/18 |

* cited by examiner

*Primary Examiner* — Barry Taylor
(74) *Attorney, Agent, or Firm* — Howison & Arnott, LLP

(57) ABSTRACT

A method for authenticating a user transaction based upon scanned wireless signals is disclosed and includes receiving a wireless fingerprint from a mobile unit associated with a transaction by a user at a location, determining if the received wireless fingerprint matches a stored wireless fingerprint associated with the location, and authorizing the transaction if the received wireless fingerprint matches the stored wireless fingerprint associated with the location. If the location is not known or known as a "bad" location, additional information to authenticate the user or transaction can be requested from the user via a phone call, push notification within an application or a text message.

13 Claims, 19 Drawing Sheets

AUTOMATICATION OF A USER TRANSACTION BASED UPON SCANNED WIRELESS SIGNALS

CROSS-REFERENCE TO RELATED APPLICATIONS

This application is a continuation of U.S. patent application Ser. No. 13/464,442, filed May 4, 2012, entitled AUTOMATING ACTIONS WITH A PHONE NETWORK BASED UPON SCANNED WIRELESS SIGNALS which claims benefit of U.S. Provisional Application No. 61/544,370, filed Oct. 7, 2011, entitled AUTOMATING ACTIONS WITH A PHONE NETWORK BASED UPON SCANNED WIRELESS SIGNALS. This application also claims benefit of U.S. Provisional Application No. 61/592,778, filed Jan. 31, 2012, entitled AUTHENTICATION OF A USER TRANSACTION BASED UPON SCANNED WIRELESS SIGNALS, the specification of which is incorporated herein in its entirety.

This application is related to U.S. patent application Ser. No. 13/756,434, filed on Jan. 31, 2013, entitled DETERMINING VIRTUAL LOCATION BASED UPON SCANNED WIRELESS SIGNALS, now U.S. Pat. No. 8,805,352, issued on Aug. 12, 2014.

TECHNICAL FIELD

The following disclosure relates to authenticating a transaction based upon scanned wireless signals to verify a user location via a second factor authentication methodology.

BACKGROUND

Systems exist for allowing for third party or second factor authentication by using a software application or proprietary hardware device like a USB dongle with an electronic connection or key fob token which displays a rolling code. This data is augmented with traditional security methods such as a user name and password to ensure that a person logging into a secure network or system is who they say they are, via the presence of this second factor. Called TFA, T-FA or 2FA, this requires the server to be presented with of "two or more" of the three authentication "factors" before allowing access or a transaction. The security model employs "something the user knows", "something the user has", and "something the user is" and is more secure than just a username and password combination.

SUMMARY

In one aspect thereof, a method for authenticating a user transaction based upon scanned wireless signals includes receiving a wireless fingerprint from a mobile unit associated with a transaction by a user at a location, determining if the received wireless fingerprint matches a stored wireless fingerprint associated with the location, and authorizing the transaction if the received wireless fingerprint matches the stored wireless fingerprint associated with the location.

BRIEF DESCRIPTION OF THE DRAWINGS

For a more complete understanding, reference is now made to the following description taken in conjunction with the accompanying drawings in which.

DETAILED DESCRIPTION

Figure 1:
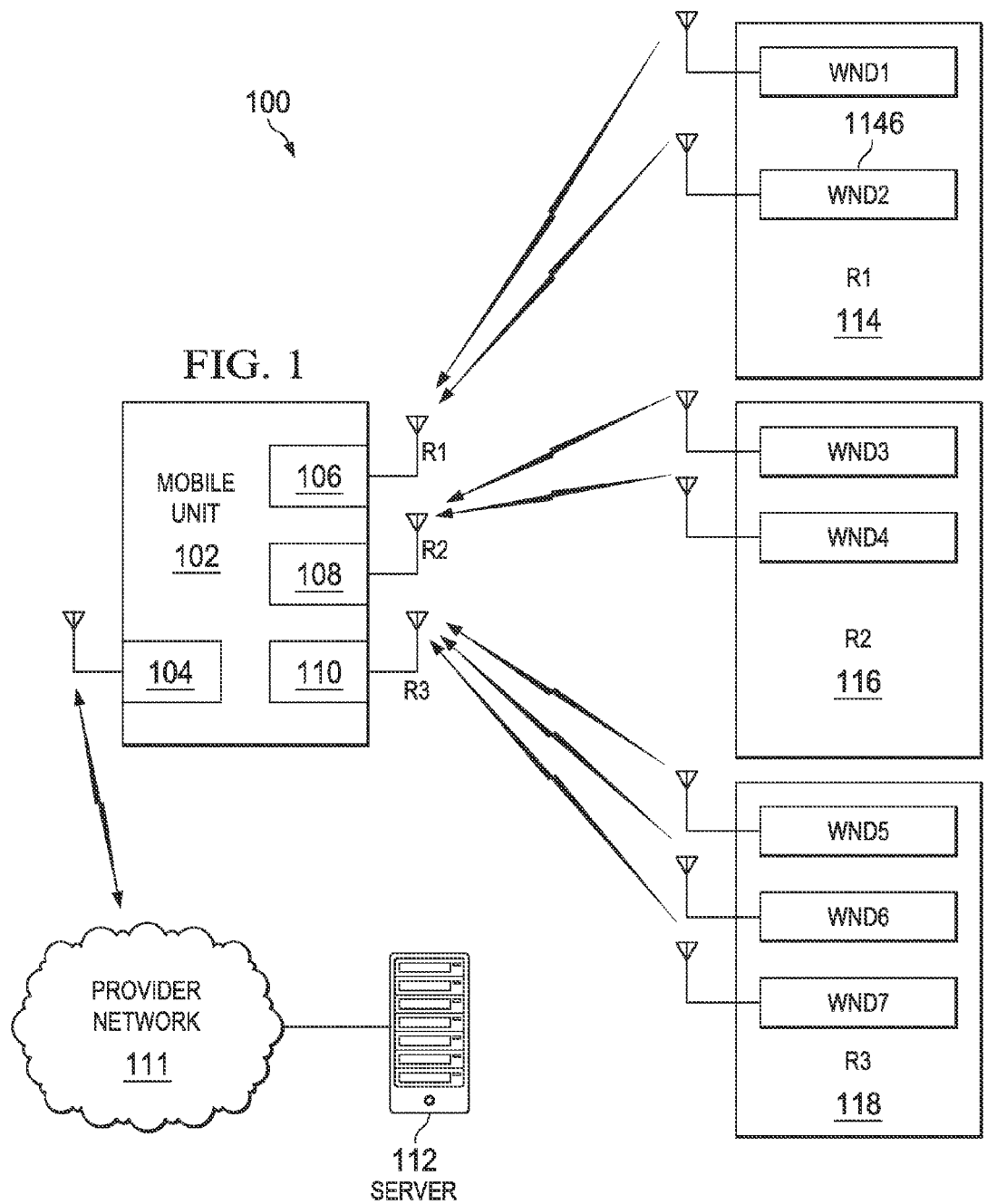
FIG. 1 illustrates an embodiment of a system for automating actions based upon scanned wireless signals in the proximity of a mobile unit.

FIG. 1 illustrates an embodiment of a system 100 for automating actions based upon the presence of scanned wireless signals in the proximity of a mobile unit. In various embodiments, the system 100 provides a platform for automating actions within a mobile unit such as a mobile phone or within a network based upon the presence or lack thereof of detected wireless signals by the mobile unit. The system 100 includes a mobile unit 102 having the capability to receive one or more types of wireless signals transmitted by wireless network devices or other wireless sources. In various embodiments, the mobile unit 102 may include a cell phone, a smart phone, a PDA, a tablet device, or any other type of mobile communication device. In the particular embodiment illustrated in FIG. 1, the mobile unit 102 includes a cellular transceiver 104, a Bluetooth transceiver 106, a Wi-Fi transceiver 108, and a near field communication (NFC) or radio-frequency identification (RFID) transceiver 110. The cellular transceiver 104 includes the capability to receive cellular signals transmitted by a provider network 111. In particular embodiments, the cellular signals may include one or more of CDMA, GSM, LTE, or any other cellular transmission technology. The Bluetooth transceiver 106 includes the capability to receive signals transmitted using Bluetooth technology such as that specified by the IEEE standard 802.15.1 in the 2.4 GHz frequency spectrum. The Wi-Fi transceiver 108 is configured to receive signals transmitted by wireless network devices using Wi-Fi technology such as that specified in various IEEE 802.11 standards. The near field communication (NFC) transceiver 110 is configured to receive signals transmitted by wireless network devices using near field communication technologies such as those specified by ISO Standard 13157 using the 13.56 MHz frequency spectrum or RFID signals using technologies such as those specified by ISO/IEC 14443, ISO 14223, ISO/IEC 15693, ISO/IEC 18000, ISO/IEC 18092, ISO 18185, or ISO/IEC 21481 standards. Near field communication (NFC) allows for simplified transactions, data exchange and wireless connections between two devices in close proximity to one another, usually by no more than a few centimeters. Also, 802.15.xx can be included. In another embodiment, RFID technologies may have the same capabilities and characteristics as that of NFC technologies.

The system 100 includes a server 112 in communication with the provider network 111. The server 112 includes a database for storing various wireless fingerprints as will be further described herein. The system 100 further includes a plurality of Bluetooth wireless network devices 114, a plurality of Wi-Fi wireless network devices 116, and a plurality of NFC or RFID wireless network devices 118. The system 100 may further include a plurality of cellular towers. The Bluetooth wireless network devices 114 include a first Bluetooth wireless network device WND1 and a second Bluetooth wireless network device WND2. The Bluetooth wireless network devices may include any wireless network device capable of transmitting a Bluetooth signal including a laptop computer, a cell phone, a smart phone, a television or set-top box equipment, a Bluetooth equipped automobile or a Bluetooth headset. Bluetooth signals transmitted by each of the Bluetooth wireless network devices 114 are received by the Bluetooth transceiver 106 of the mobile unit 102. The Wi-Fi wireless network devices 116 include a first Wi-Fi wireless network device WND3 and a second Wi-Fi wireless network device WND4. The Wi-Fi wireless network devices 116 transmit Wi-Fi signals which are received by the Wi-Fi transceiver 108 of the mobile unit 102. The Wi-Fi wireless network devices 116 may include a mobile device having Wi-Fi capability, a router, a wireless access point, or any other source of Wi-Fi signals. The NFC wireless network devices 118 include a first NFC wireless network device WND5, a second NFC wireless network device WND6, and a third NFC wireless network device WND7. The NFC wireless network devices 118 are configured to transmit NFC or RFID wireless signals.

In an exemplary operation of the system 100, the mobile unit 102 contains a software application or operating system which, when executed, has the capability to cause the mobile unit 102 to scan for the presence of wireless signals received by one or more of the cellular transceiver 104, the Bluetooth transceiver 106, the Wi-Fi transceiver 108, and a near field communication (NFC) or RFID transceiver 110. In a particular embodiment, the software application may be previously downloaded by a user to the mobile unit 102 from an application store, application marketplace, or a website. Upon detecting the one or more wireless signals, the mobile unit 102 obtains identifying information from each of the wireless signals. In particular embodiments, the mobile unit 102 obtains a media access control (MAC) address or other identifier from the detected wireless signal. The MAC address uniquely identifies the wireless network device that transmits a particular wireless signal. For example, the MAC address may be associated with a Wi-Fi device, a Bluetooth device, an NFC or RFID device, a cellular device or a cellular tower. In still other embodiments, the mobile unit 102 may further determine signal strength of each of the received signals, the time of reception of the signal by the mobile unit 102, and the location of the mobile unit 102 when the signal was received, such as by using GPS signals or cellular triangulation. An advantage offered by the system 100 is that the mobile unit 102 does not have to actually establish a connection with a particular wireless network device in order to obtain the identifying information; it merely has to detect and receive a signal transmitted by such a wireless network device. In other embodiments, both a MAC address and user ID (UID) or an obfuscated hash variant may be used to identify a wireless signal. For example, some devices such as iPhones do not allow access to the MAC address of a device from another iPhone, but they do reveal a portion of their device ID with is a hash of the serial number and the software ID. This may be unique on a software-by-software basis, so that one phone may have one ID for one application, and another unique ID for another application.

Upon scanning the wireless signals transmitted from one or more wireless network devices by the mobile unit 102, the mobile unit 102 collects identifying information from each of the wireless signals and transmits the identifying information such as the MAC address, signal strength, time, location and any other parameters to server 112 via the provider network 111. The server 112 then performs one or more heuristic algorithms on the collected information to determine a wireless fingerprint associated with the current location of the mobile unit 102. The wireless fingerprint is determined based upon the identifying information associated with one or more of the wireless signals obtained during the scanning operation of the mobile unit 102. If the particular wireless fingerprint has not previously been registered with the server 112, the user of the mobile unit 102 may be prompted to designate the wireless fingerprint as associated with the present location of the mobile units 102. If the server 112 recognizes the wireless fingerprint as previously being registered, the server 112 sends an indication to either the mobile unit 102 or another network device to perform an action associated with that particular wireless fingerprint. In one embodiment, the designated action may be an action that is to be performed by the mobile unit 102. In still other embodiments, the designated action may be an action performed by a network device, such as a switch, of the provider network 111. For example, an action which may be associated with the mobile unit 102 includes vibration of the mobile unit 102, showing the location of an item on a map, displaying a video on the mobile unit 102, or displaying an advertisement on the mobile unit 102 upon detection of a particular wireless fingerprint.

In another example, recognition of a particular wireless fingerprint may cause the provider network 111 to change call routing or initiate a call via a switch. For example, a user may designate a scan of the environment of an office for wireless signals and designate that location as the user's office using the mobile unit 102. The server 112 determines a wireless fingerprint associated with the office location from the identifying information of the wireless signals and the user may designate that, upon detection of the wireless fingerprint associated with the office location, calls addressed to the mobile unit 102 should be routed to a telephone within the office instead. In still another example, the recognition of a particular wireless fingerprint may cause a network device such as a television, router, or set-top box to perform a specific action upon detection of the mobile unit 102 being in the presence of the location associated with the wireless fingerprint. In a particular example, music may be streamed from the mobile unit 102 to the network device upon detection of a particular wireless fingerprint.

Although various embodiments may describe a wireless fingerprint as being associated with a "location" it should be understood that a wireless fingerprint may not necessarily be associated with a static location. For example, a user may associate a wireless Bluetooth signal associated with a friend's mobile telephone to an action of vibrating the mobile unit 102. Upon the detection of the wireless fingerprint associated with the friend's mobile telephone by the mobile unit 102, such as when the friend arrives at the same party as the user, the mobile unit 102 may automatically vibrate or send a network command to a social networking Internet service to indicate to the user that the friend has arrived.

Although it is described in various embodiments that the server 112 performs various actions such as recognizing a wireless fingerprint and determining a fingerprint print from detected signals, it should be understood that in other embodiments, recognition of a fingerprint and/or determining of a fingerprint may be performed by other devices such as by the mobile unit 102. Furthermore additional network devices such as cellular networks or networking equipment on an internal wireless infrastructure (WLAN) could contain the recognition software as well. In other embodiment, a Wi-Fi router contains the detection software and performs the rules-based database lookup. In still other embodiments, a cellular tower contains the detection software and performs the rules-based database lookup.

Figure 2:
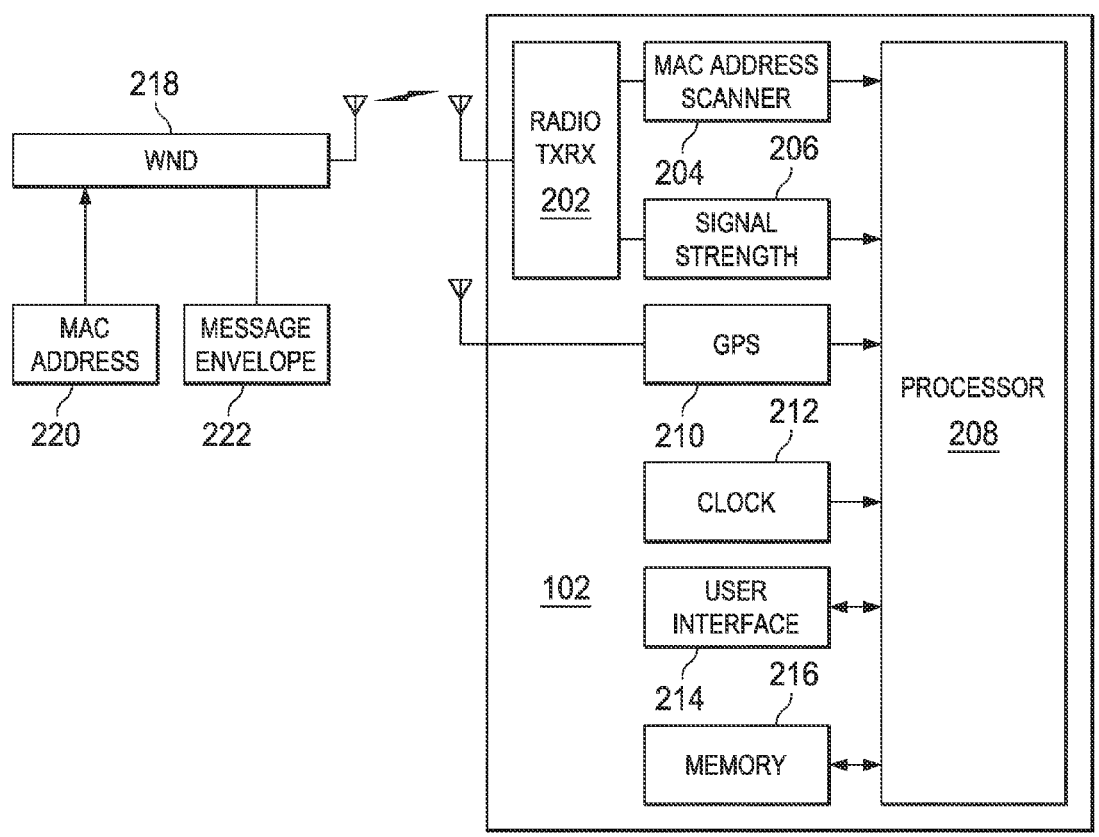
FIG. 2 illustrates an embodiment of a mobile unit and a wireless network device.

FIG. 2 illustrates an embodiment of a mobile unit 102 and a wireless network device 218. The mobile unit 102 includes a radio transceiver 202 configured to receive one or more wireless signals within the environment of the mobile unit 102. Although in the particular embodiment illustrated in FIG. 2, the wireless mobile unit 102 includes a single radio transceiver 202, it should be understood that the mobile unit 102 may include a number of different radio receivers each configured to receive a different type of wireless signal such as cellular, Wi-Fi, Bluetooth, and NFC, as previously described. The mobile unit 102 further includes a MAC address scanner module 104 coupled to the radio transceiver 202 and configured to determine a MAC address associated with a particular wireless signal received by the radio transceiver 202. The mobile unit 102 further includes a signal strength module 206 coupled to the radio transceiver 202 and configured to determine a signal strength associated with the received wireless signal. The MAC address scanner module 204 and the signal strength module 206 are further coupled to a processor 208 to provide the MAC address and signal strength to the processor 208. The mobile unit 102 includes a GPS module 210 configured to receive a GPS signal and provide the GPS signal to the processor 208 in order to determine a location associated with the mobile unit 102. In still other embodiments, the mobile unit 102 may determine its location via cellular triangulation or any other method for location determination. The mobile unit 102 further includes a clock module 212 coupled to the processor 208 and configured to provide a time associated with the reception of a signal to the processor 208. The mobile unit 102 includes a user interface 214 coupled to the processor 208 to allow a user to provide user inputs to the processor 208 as well as allow the processor 208 to provide outputs to the user. For example, in a particular embodiment, the user interface may include a touch screen or keypad to provide input to the mobile unit 102, and a display screen to provide output to the user. A mobile unit 102 further includes a memory 216 coupled to the processor configured to store the scanning application, identifying information associated with received wireless signals such as MAC addresses or an obfuscated hash variant and signal strengths, locations and times, as well as store other data required by the mobile unit 102 during operation.

The wireless network device 218 has a MAC address 220 uniquely associated with the wireless network device 218 and a message envelope 222. The wireless network device 218 transmits a wireless signal within a message envelope 222 which includes the MAC address 220. The radio transceiver 202 of the mobile unit 102 receives the wireless signal transmitted from the wireless network device 218, extracts the MAC address associated with the wireless signal and determines a signal strength associated with the wireless signal. The mobile unit 102 may further determine a GPS location and time of receipt associated with the received wireless signal from the GPS module 210 and clock module 212, respectively. The mobile unit 102 then transmits the identifying information associated with the wireless signals received from the wireless network device 218 to the server 112 via the radio transceiver 202.

Figure 3:
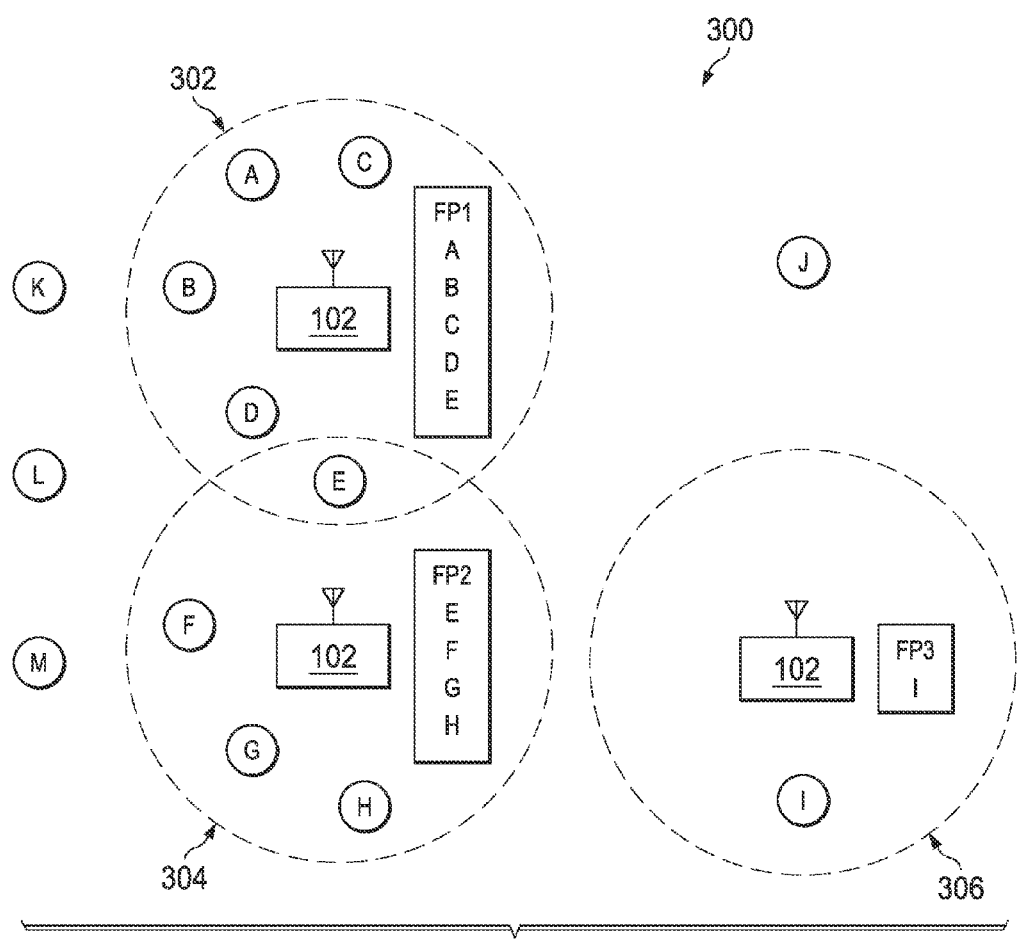
FIG. 3 illustrates an exemplary environment in which the mobile unit operates within different locations in which each location has a different wireless fingerprint associated therewith.

FIG. 3 illustrates an exemplary environment 300 in which the mobile unit 102 operates within different locations in which each location has a different wireless fingerprint associated therewith. In the embodiment illustrated in FIG. 3, the mobile unit 102 is illustrated as being in three different locations as will be further described. The environment 300 includes a number of wireless network devices (WNDs) A-M. In a first location of the mobile unit 102, the mobile unit 102 possesses a reception range 302 in which the mobile unit 102 is able to receive wireless signals from wireless network devices A, B, C, D, E. From the wireless signals transmitted by each of wireless network devices (WNDs) A-E, a first wireless fingerprint FP1 is obtained consisting identifying information from respective wireless signals transmitted by wireless network devices A, B, C, D and E. Although for simplicity the embodiment illustrated in FIG. 3 is shown as using identifiers associated with each of the wireless network devices as a fingerprint, it should be understood that the actual fingerprint may include a MAC address or an obfuscated hash variant, signal strength, time, and location of each of the wireless signals as well as other identifying information. In a second location, the mobile unit 102 has a reception area 304 which encompasses the wireless signals emitted by a wireless network device E, F, G, and H. The resulting second fingerprint FP2 includes the wireless signals transmitted from wireless network devices E, F, G, and H. In a third location, the mobile unit 102 has a reception area 304 which encompasses the wireless signal from only a single wireless network device I. The resulting third wireless fingerprint FP3 includes the wireless signal transmitted by wireless network device I. In the embodiment illustrated in FIG. 3, wireless network devices J, K, L and M sources represent wireless signals which are not received by the mobile unit 102 while the mobile unit 102 is within any of the three locations of the environment 300.

Figure 4:
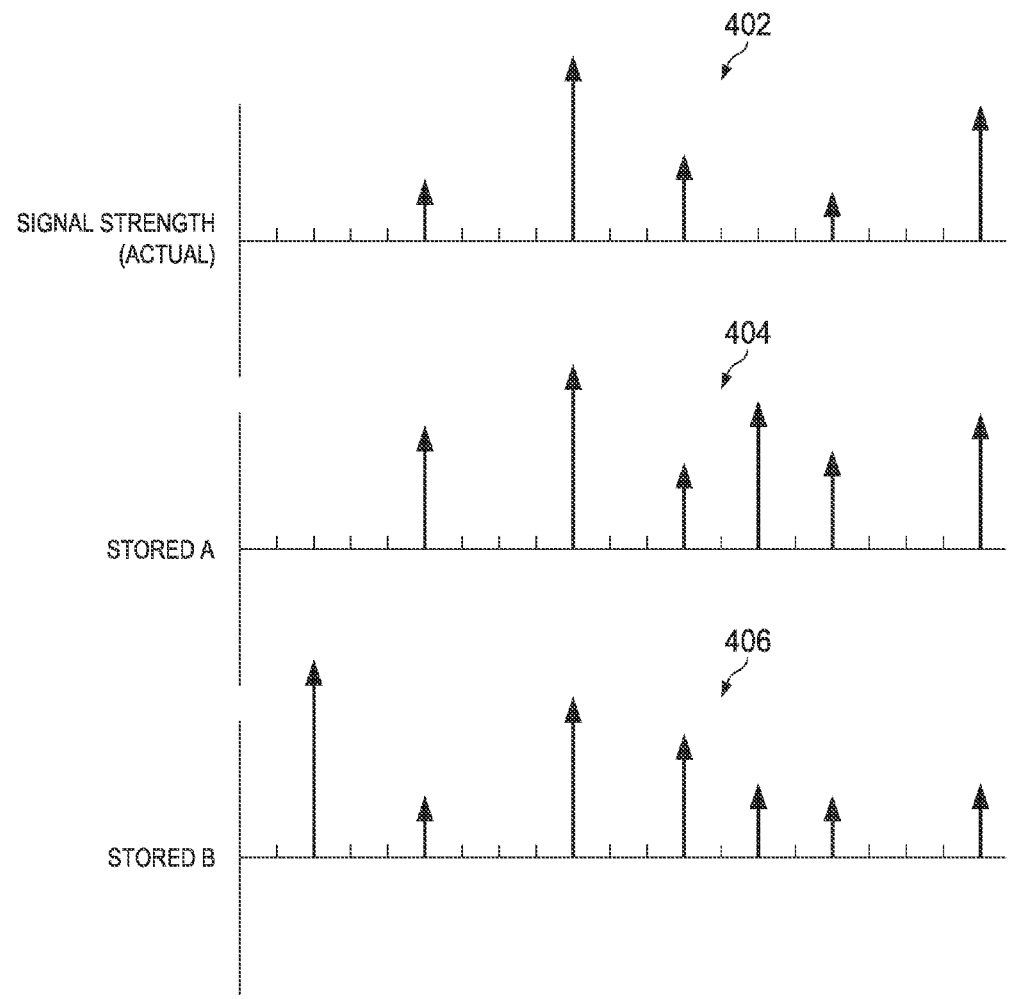
FIG. 4 illustrates an example of an actual measured signal strength of wireless network signals by the mobile unit and two stored wireless fingerprints.

FIG. 4 illustrates an example of an actual measured signal strength of wireless network signals by the mobile unit 102 and two stored wireless fingerprints. In FIG. 4, an actual measured signal strength of wireless signals received by a mobile unit 102 at a particular location is shown in 402. A stored wireless fingerprint stored A is illustrated by 404, and a stored wireless fingerprint stored B illustrated by 406. The wireless fingerprint stored A (404) and wireless fingerprint stored B (406) are stored within the database of the server 112.

The actual measured signals 402 are compared against the stored fingerprints stored A and stored B by the server 112 to determine whether the actual measured signals are an acceptable match to a stored wireless fingerprint. In various embodiments, the server may use heuristics to determine whether the actual measured signals 402 match a stored fingerprint stored A (404) or stored B (406). As cam be seen in FIG. 4, none of the stored fingerprints (404, 406) are an exact match of the actual measure wireless signals 402. Signal strengths of the actual signals 402 differ from those of the stored fingerprints 404 and 406. In addition, the stored fingerprints 404 and 406 contain signals that are not present in the actual measured signals 402. In a particular embodiment, the server 112 may determine that fingerprint stored A 404 is the closest match to the actual measured signals 402 and that it matches fingerprint stored A 404 to an acceptable level. As a result, the server 112 will send an indication, for example to the mobile unit 102, to perform an action associated with fingerprint stored A (404).

Figure 5:
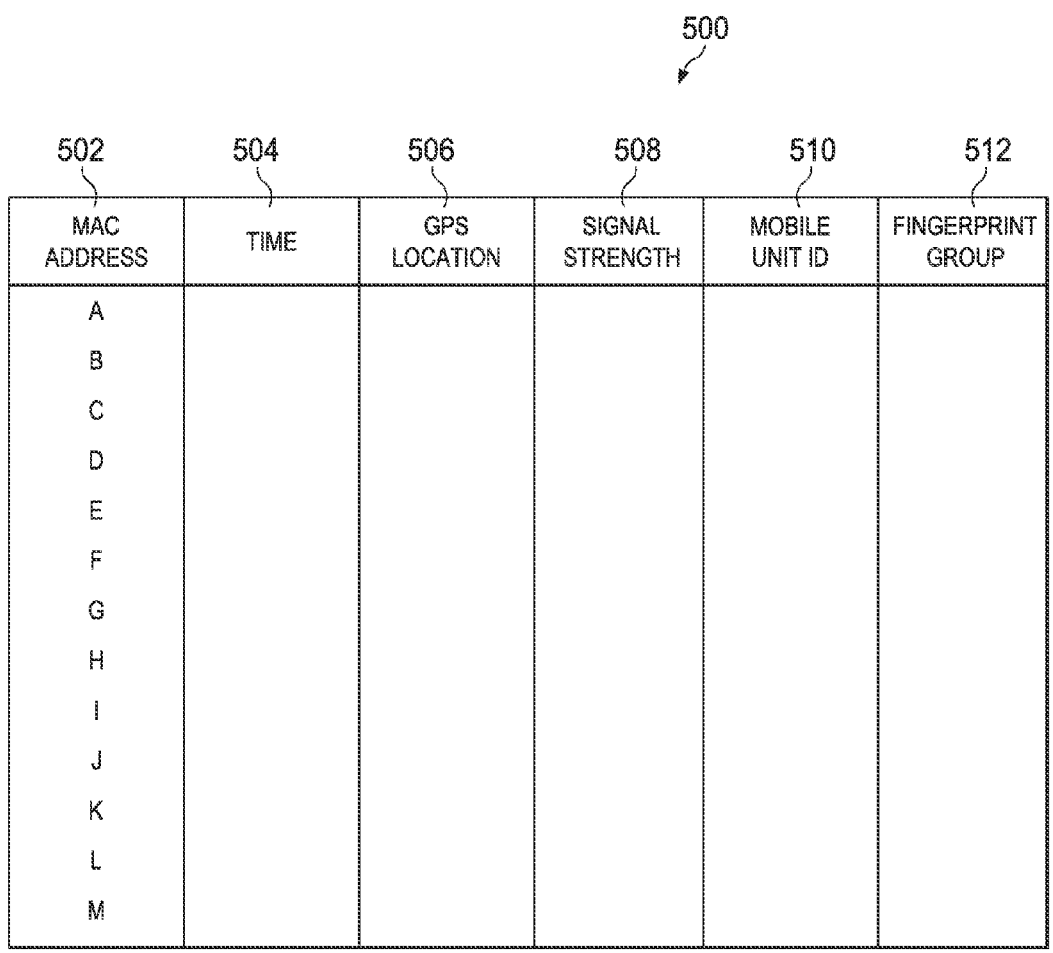
FIG. 5 illustrates an embodiment of a database within the server for storing wireless fingerprints.

FIG. 5 illustrates an embodiment of a database 500 within the server 112 for storing wireless fingerprints. The database 500 contains fields associated with each of the wireless signals detected by the mobile unit 102 which are used in determining a particular wireless fingerprint. The database 500 includes a MAC address field or an obfuscated hash variant 502, a time field 504, a GPS location field 506, a signal strength field 508, a mobile unit ID field 510 and a fingerprint group 512. The MAC or an obfuscated hash variant address field 502 includes an address associated with a particular wireless signal, the time field includes the time of reception of a particular wireless signal, the GPS location field 506 includes a GPS location of the mobile unit 102 at the time of the reception of a particular wireless signal, and a signal strength field 508 includes a measured signal strength of a particular wireless signal. The mobile unit ID field 510 includes a mobile unit ID associated with the mobile unit 102, and the fingerprint group field 512 contains an indication of a particular fingerprint to which the detected wireless signal belongs.

Figure 6:
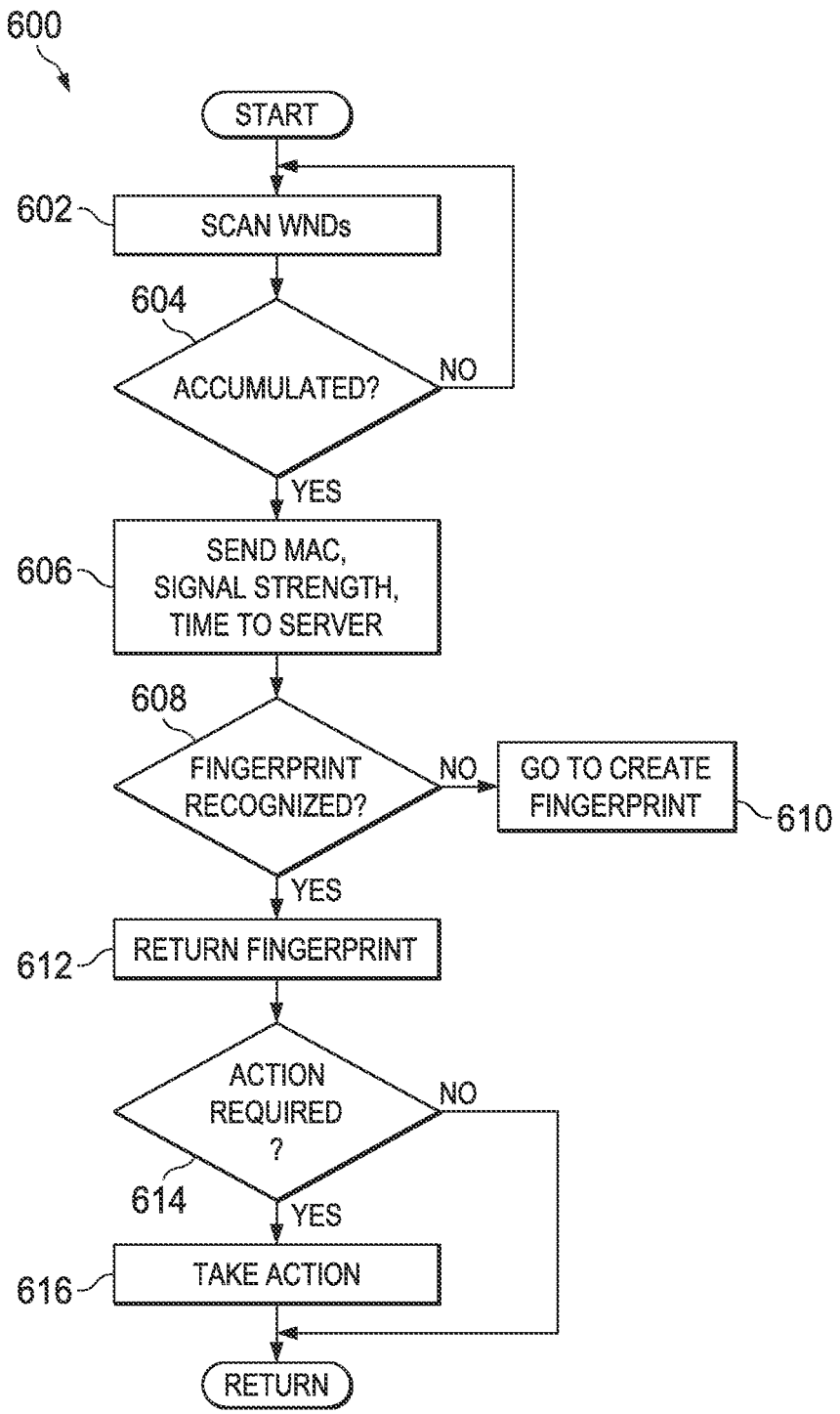
FIG. 6 illustrates an embodiment of a procedure for a executing a scanning procedure of the mobile unit.

FIG. 6 illustrates an embodiment of a procedure 600 for a executing a scanning procedure of the mobile unit 102. In various embodiments, the scanning procedure is performed by a software application executed by the mobile unit 102. In step 602, the mobile unit 102 scans the frequency spectrums receivable by the mobile unit 102 for the presence of wireless network device signals and determines the MAC address, signal strength, and time of reception of any wireless signal received from a wireless network device. In step 604 it is determined whether all of the receivable wireless signals have been accumulated. If not all of the receivable wireless signals have been accumulated the procedure returns to step 602 in which scanning is continued. If all the receivable wireless network signals have been accumulated the procedure continues to step 606 in which the MAC address or an obfuscated hash variant, signal strength and time of reception of each of the detected wireless network signals are sent to the server 112. In some embodiments, the location of the mobile unit 102 during the reception of each of the wireless network signals may also be sent to the server 112. In step 608 it is determined whether a wireless fingerprint represented by the received wireless network signals is recognized by the server 112. The server 112 determines whether the received wireless network signals match a fingerprint in the database of the server 112 using heuristic or any other algorithm. If the wireless fingerprint is not recognized, the procedure continues to step 610 in which a procedure to create a fingerprint associated with the currently received wireless signals is initiated. This procedure will be further described herein with respect to FIG. 8. If the fingerprint is recognized in step 608, a fingerprint identifier is returned in step 612. In step 614 it is determined whether an action is required due to the detection of the wireless fingerprint. If no action is required, the procedure returns to the start. If it is determined in step 612 that an action is required, the required action is taken in step 614 and the procedure returns to the start.

Figure 7:
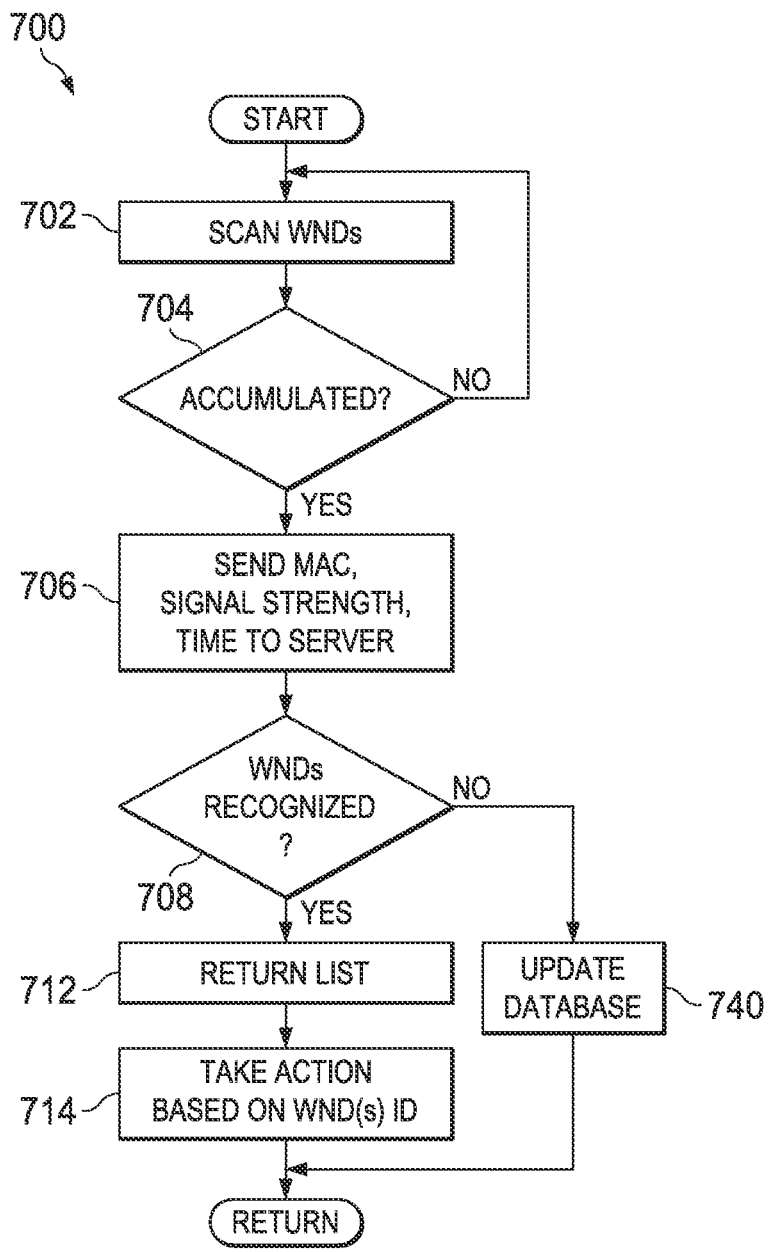
FIG. 7 illustrates an embodiment of a procedure in which the scanning procedure of the mobile unit automatically collects fingerprint data of the environment in which the mobile unit is located.

FIG. 7 illustrates an embodiment of a procedure 700 in which the scanning procedure of the mobile unit 102 automatically collects fingerprint data of the environment in which the mobile unit 102 is located. In step 702, the mobile unit 102 scans for the presence of wireless signals associated with wireless network devices. In step 704 it is determined whether all receivable wireless signals have been accumulated if not, the procedure returns to step 702 in which scanning continues. If all the wireless signals have been accumulated, the procedure continues to step 706 in which the MAC address, signal strength, and times associated with the wireless signals are sent to the server 112. In step 708, the server 112 determines whether the wireless network devices are recognized as being previously detected within the database of the server 112. If the wireless network devices are not recognized, the procedure continues to step 710 in which the database within server 112 is updated to include the identifying information associated with the newly scanned wireless signals. The procedure 700 then returns to start. If all the wireless network devices are recognized in step 708, the procedure continues to step 712 in which a list of the wireless network devices is returned to the mobile unit 102. In step 714 any action associated with a fingerprint represented by the detected wireless network devices is taken, and the procedure 700 then returns to the start.

Figure 8:
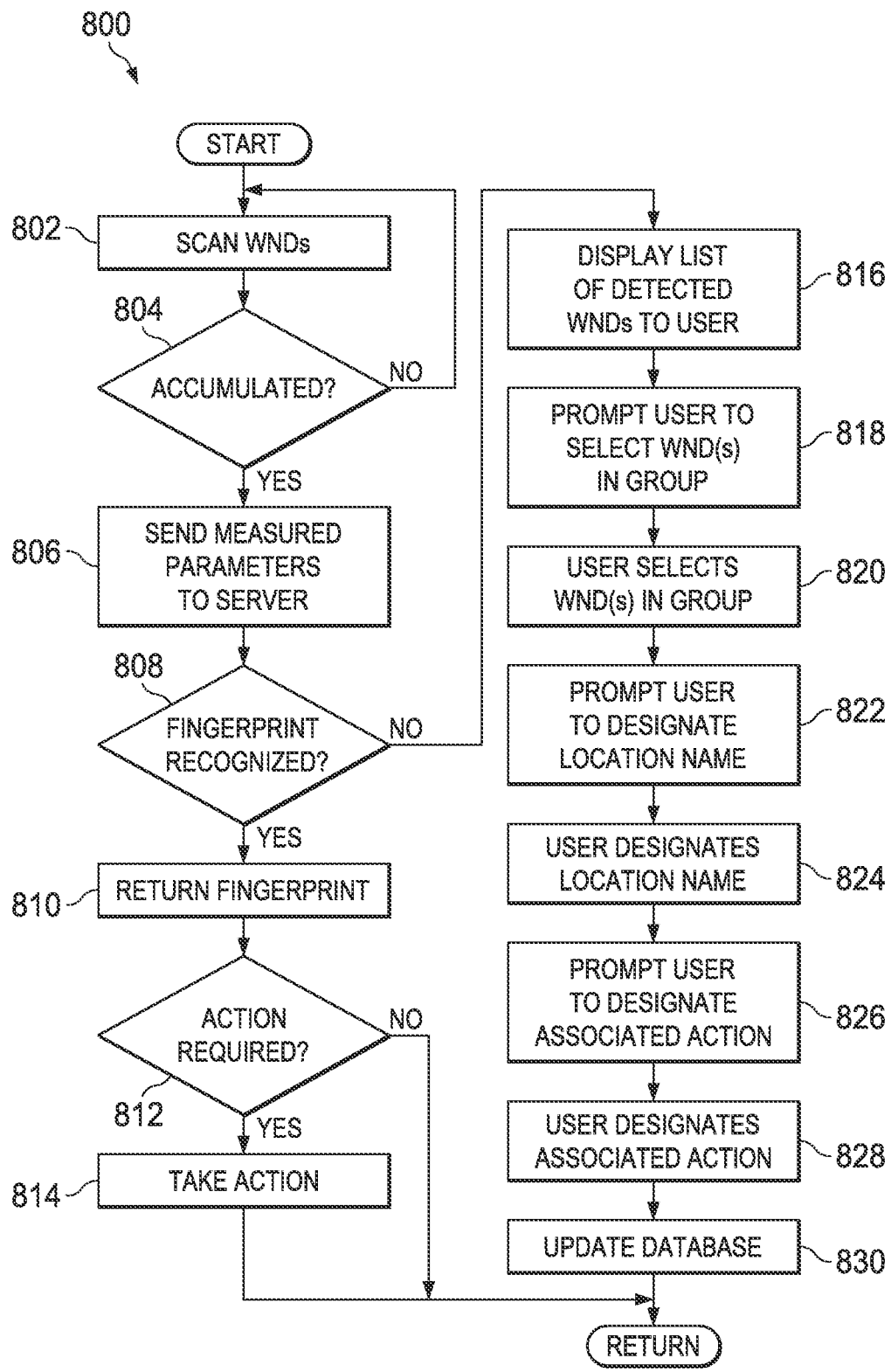
FIG. 8 illustrates an embodiment of a procedure for scanning wireless network devices and associating an action with a wireless fingerprint.

FIG. 8 illustrates an embodiment of a procedure 800 for scanning wireless network devices and associating an action with a wireless fingerprint. In step 802, the mobile unit 102 scans for wireless network devices. In step 804, the mobile unit 102 determines whether all of the available wireless network devices having wireless signals scannable by the mobile unit 102 have been accumulated. If it is determined in step 804 that the scanned wireless network devices have not been accumulated, the procedure returns to step 802 in which the scanning of wireless network devices is continued. If it is determined in step 804 that the scanned wireless network devices have been accumulated, the procedure 800 continues to step 806. In step 806, the mobile unit 102 sends the measured parameters of each of the scanned wireless network device signals to the server 112. The measured parameters may include one or more of the MAC address or an obfuscated hash variant, signal strength, time of reception, and location of the mobile unit 102 of each of the scanned wireless signals from each of the wireless network devices. In step 808, the server 112 determines whether the wireless fingerprint associated with the scanned wireless network devices is recognized by the server 112. If the fingerprint is recognized, the procedure continues to step 810 in which the fingerprint is returned from the database of the server 112. In step 812, it is determined whether an action associated with the fingerprint is required to be performed. In one embodiment, the determination of whether an action is to be performed in association with the recognition of a wireless fingerprint is done by the mobile unit 102. In still other embodiments, the recognition of whether an action is required to be performed by the detection of an associated fingerprint is performed by the server 112 or by a node associated with the provider network 111. If no action is required, the procedure returns to the start. If an action is required the action is taken in step 814. In various embodiments, the action may be performed by one or more of the mobile unit 102, the server 112, or a network node associate with a provider network 111.

If it is determined in step 808 that the fingerprint is not recognized, the procedure continues to step 816 in which a procedure allowing a user to create a fingerprint to be associated with the currently received wireless signals is initiated. In step 816, a list of detected wireless network devices is displayed to the user the mobile unit 102. In step 818, the user is prompted to select one or more of the wireless network devices as a group. In step 820 the user selects the wireless network devices in the group which are to be included in the created wireless fingerprint. In other embodiments, step 820 may be omitted and the designation of which signals are to be included in the created fingerprint is performed automatically by the server 112 or the mobile unit 102. In step 822, the user is prompted to designate a location name to be associated with the selecting group of wireless network devices that are to form the fingerprint. In step 824, the user designates the location name. For example, the user name may designate a location name to be associated with a particular group of selected wireless network devices as a home, office, or the name of a particular restaurant. In step 826, the user is prompted to designate an associated action with the selected group. In a particular embodiment, the user may be presented with a list of available actions from which to choose from. In step 828, the user designates the associated action. Examples of associated actions may include notification by the mobile unit 102 that a wireless fingerprint associated with the selected group has been detected, routing incoming calls to a telephonic device at the designated location upon detection of the wireless fingerprint, or initiating an action within a network device such as streaming music to a set-top box connected to a television upon the mobile unit 102 detecting the wireless fingerprint associated with the location of the set-top box. In still other examples, the designated action to be associated with a particular wireless fingerprint may include the launching of an application on the mobile unit 102 or to steam audio or video to the mobile unit 102 upon detection of the wireless fingerprint. In step 830, the database of the server 112 is updated to include the measured parameters associated with the wireless fingerprint, the location name, and the associated action as well as an identifier associated with the mobile unit 102 or the user of the mobile unit 102. The procedure 800 then returns.

Figure 9:
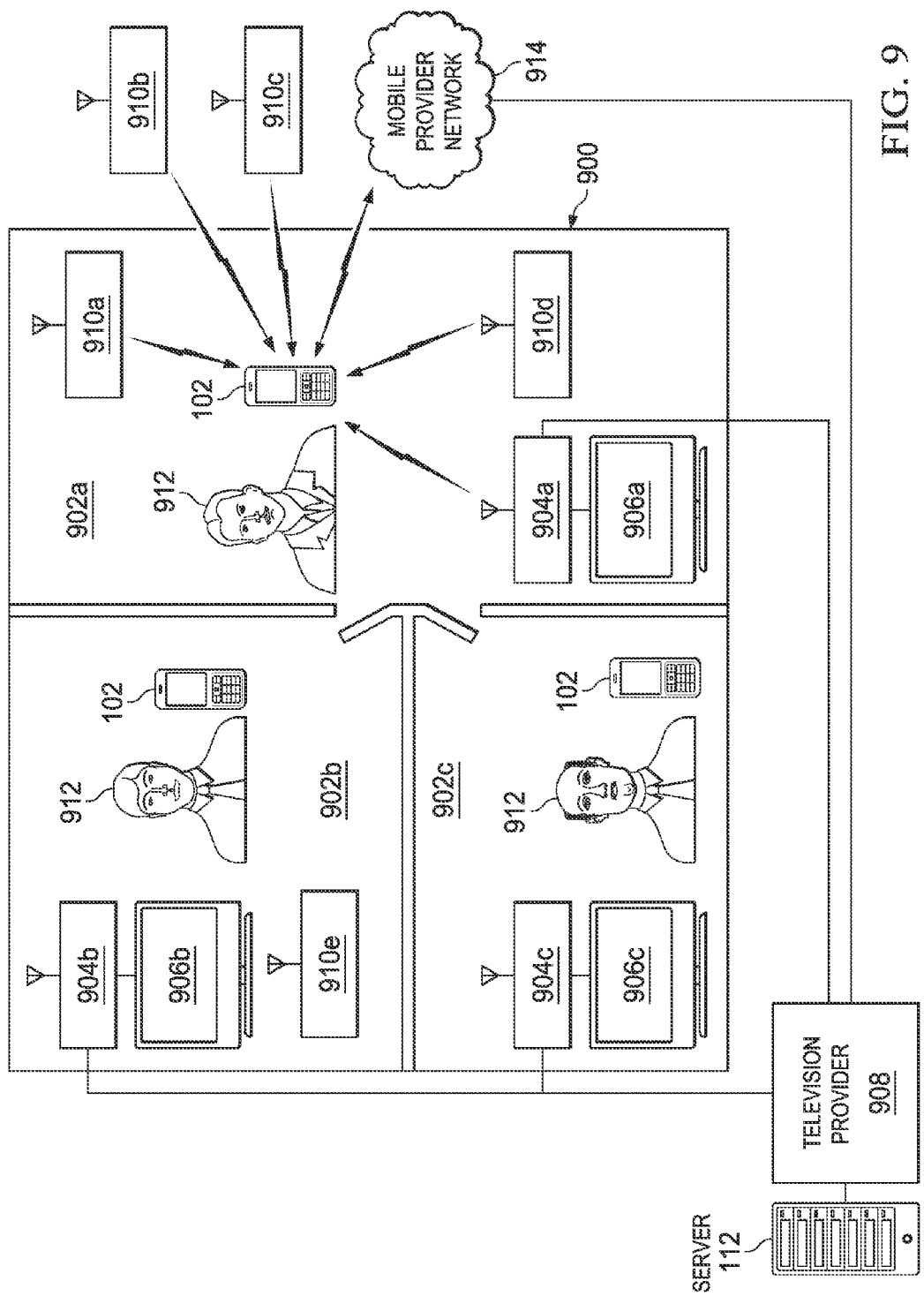
FIG. 9 illustrates an embodiment of a system for use in a residential environment for controlling a set-top box by a mobile unit based upon a detected wireless fingerprint.

FIG. 9 illustrates an embodiment of a system for use in a residential environment for controlling a set-top box by a mobile unit based upon a detected wireless fingerprint. In the embodiment illustrated in FIG. 9, a residential structure 900, such as a home, includes a first location 902A, a second location 902B and a third location 902C. In a particular embodiment, the first location 902A, second location 902B, and third location 902C are separate rooms of a home. The first location 902A has a gateway set-top box 904A connected to a video display device 906A thereat. In a particular embodiment, the first video display device 906A is a television. The second location has a second set-top box 904B connected to a second video display device 906B, and the third location 902C has a third set-top box 904C connected to a third video display device 906C. The gateway set-top box 904A, the second set-top box 904B, and the third set-top box 904C are each connected to a television provider 908 via a network such as a cable, DSL network, or wireless network. The television provider 908 further includes a server 112 incorporated therewith. The server 112 includes a database for storing wireless fingerprints as previously described herein. The residential environment includes a plurality of wireless network device 910A-910E located within an/or external to the residential structure 900. Each of the plurality of wireless network device 910A-910E are configured to transmit wireless signals including a MAC address. In various embodiments, the wireless network devices 910A-910E may include any combination of wireless signal emitter such as Wi-Fi, Bluetooth, NFC and cellular tower signals. A user 912 having a mobile unit 102 in possession may be located in the first location 902A, second location 902B or third location 902C of the residential structure 900 at different times. The mobile unit 102 is configured to communicate with a mobile provider network 914, and the mobile provider network 914 is in communication with the television provider 908. As previously described herein, the mobile unit 102 is configured to scan for the presence of wireless signals from one or more of the wireless network devices 910A-910E and perform an action if a previously registered wireless fingerprint is recognized. In a particular embodiment, the gateway to the top box 904A may include Wi-Fi or Bluetooth capability whereas the second set-top box 904B and the third set-top box 904C may not include wireless capability.

In a particular example, the user 912 stands proximate to the gateway set-top box 904A in the first location 902A and runs an application on the mobile unit 102 which scans for the presence of wireless signals from the various wireless network devices 902A-902E which are currently receivable. The user 912 may then select an identification of the appropriate set-top box, that is gateway set-top box 904A that it is currently proximate to and this data is sent to the television provider 908 via the mobile provider network 914. A server 112 determines a wireless fingerprint and correlates the location of the user 912 with the wireless fingerprint using heuristics. Similarly, the user 912 may stand proximate to each of the second set-top box 904B and the third set-top box 904C and register the mobile unit 102 with each of them respectively by measuring a wireless fingerprint at each of the second location 902B and the third location 902C. Since the receivable signals and signal strengths of the receivable signals will differ at each of the first location 902A, the second location 902B and the third location 902C, each of the first location 902A, second location 902B, and third location 902C will have a different wireless fingerprint associated therewith. Once a mobile unit 102 is registered with a particular set-top box, the mobile unit 102 may be used to control the particular set-top box upon detection of the wireless fingerprint associated with the location of that particular set-top box. Thus, the user 912 is able to move throughout the residential structure 900 and control particular set-top boxes using the mobile unit 102 without requiring the user 912 to designate the particular set-top box that is desired to be controlled.

In a particular example, the mobile unit 102 is configured to host photos using videos or other data. A user then enters the residential structure 900 and the mobile unit 102 executes a software application. The application scans for the wireless fingerprint of the current location within the residential structure 900, determines which set-top boxes are available to present photos, music or other data, and the mobile unit 102 is authenticated with each of these set-top boxes. In a particular embodiment, the user may see an indication of the video display device that the mobile unit 102 has been authenticated with the set-top box. Data on the phone, such as music and videos may be then sent over the mobile provider network 914 to the television provider 908, then sent to and received by a set-top box within the residential structure 900 over the television provider network. In particular embodiments, the audio, video or other presentation may follow the user 912 as it moves to different locations throughout the residential structure 900 so that it is routed to the appropriate set-top box associated with the location in which the user 912 is currently positioned. An advantage of such a system is that media may be presented from a mobile unit 102 on video display devices without requiring the mobile unit 102 to be authenticated on a Wi-Fi or other home network associated with the residential structure 900.

Figure 10:
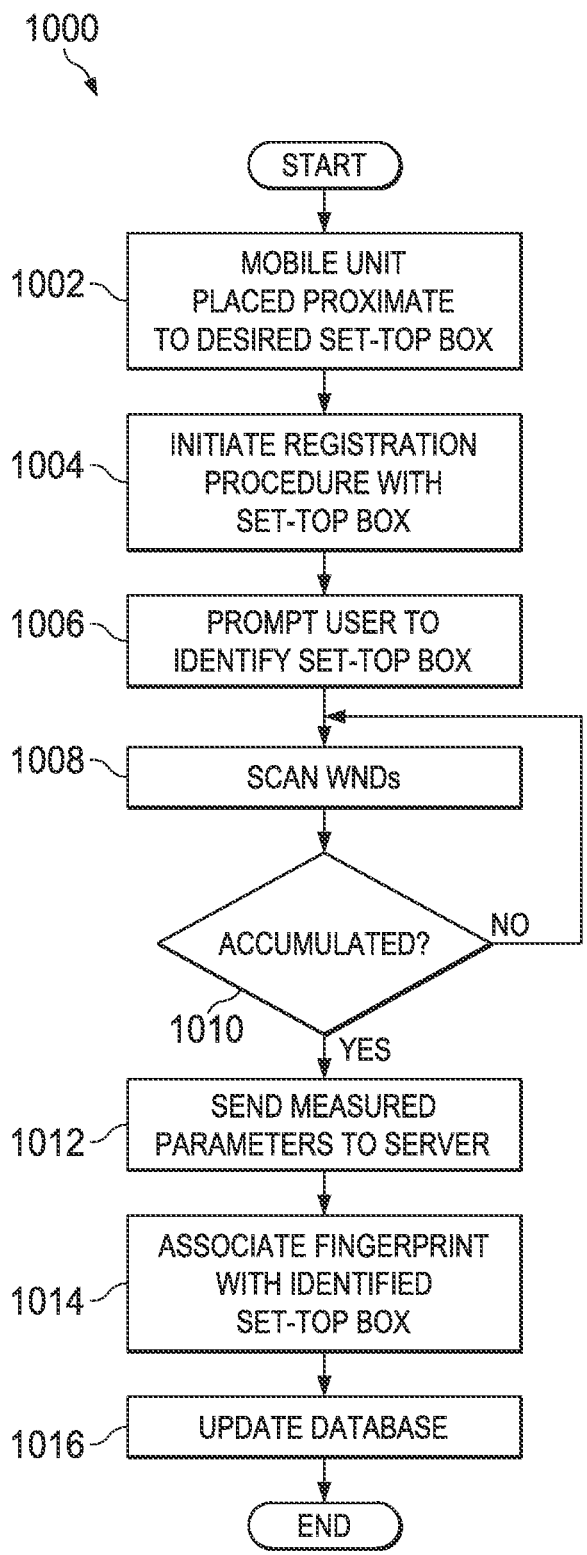
FIG. 10 illustrates an embodiment of a procedure for registering the mobile unit with a set-top box of the residential environment illustrated in FIG. 9.

FIG. 10 illustrates an embodiment of a procedure 1000 for registering the mobile unit 102 with a set-top box of the residential environment illustrated in FIG. 9. In step 1002, the mobile unit 102 is placed proximate to the desired set-top box of which the mobile unit 102 is to be registered. In step 1004, a registration procedure is initiated with a set-top box by the mobile unit 102. In step 1006, the mobile unit 102 prompts the user to identify the set to box to which registration is currently desired. In step 1008, the mobile unit 102 scans for wireless signals from wireless network devices that are receivable by the mobile unit 102. In step 1010, the mobile unit 102 determines whether all wireless network devices that are currently receivable have been accumulated. If not, the procedure 1000 returns to step 1008 in which scanning of wireless network devices is continued. If all wireless network devices have been accumulated, the procedure continues to step 1012 in which the measured parameters associated with the wireless signals received from the wireless network devices is sent to the server 112. Examples of measured parameters include MAC addresses, signal strengths, time of reception, location of the mobile unit 102, as well as an identification of the mobile unit 102 or a user associated with the mobile unit 102. In step 1014 the server 112 associates the wireless fingerprint generated from the information obtained from the scanned signals from the wireless network devices with the identified set-top box. In step 1016 the database associated with server 112 is updated to include the identifying information associated with the wireless fingerprint.

Figure 11:
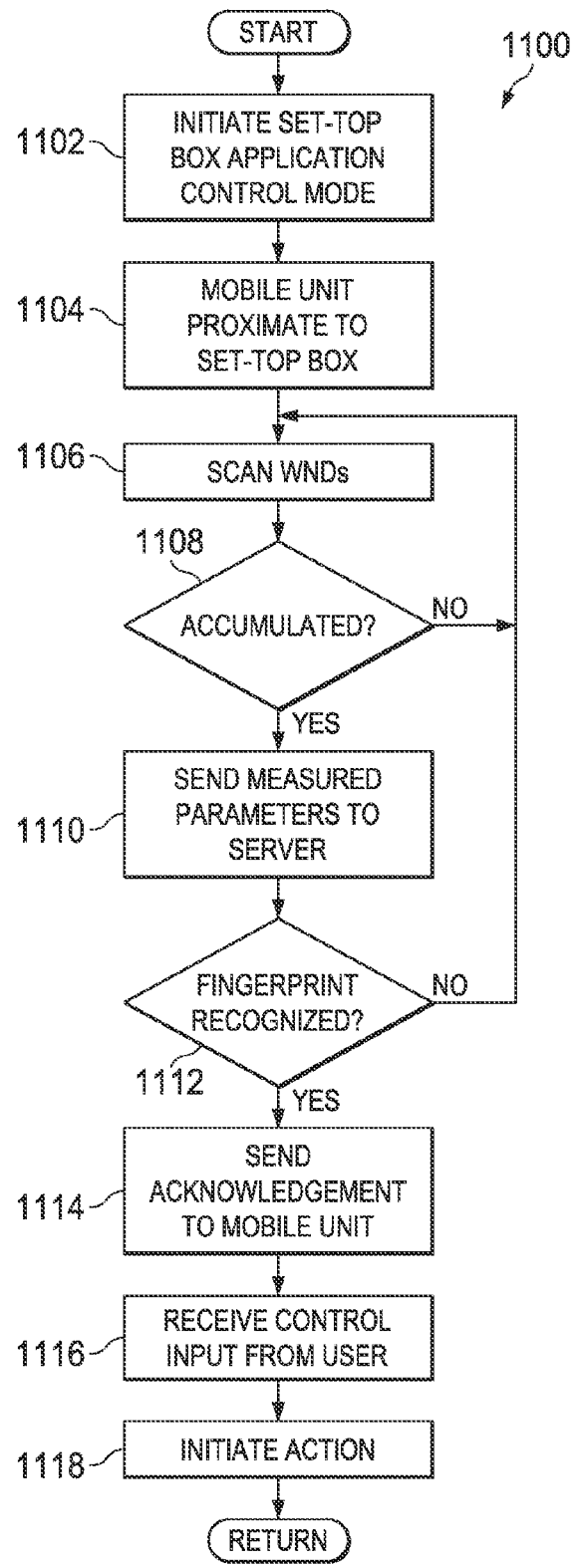
FIG. 11 illustrates an embodiment of a procedure for controlling a registered set-top box using a mobile unit based upon a detected wireless fingerprint.

FIG. 11 illustrates an embodiment of a procedure 1100 for controlling a registered set-top box using a mobile unit 102 based upon a detected wireless fingerprint. In step 1102, the mobile unit 102 initiates a set-top box application control mode of a software application. In one embodiment, the initiation of the set-top box control mode may be performed by a user of the mobile unit 102. In still other embodiments, the initiation of the set-top box application control mode may be formed automatically upon detection of a wireless fingerprint. In step 1104, the mobile unit 102 is placed proximate to the set-top box. In step 1106, the mobile unit 102 scans for wireless signals transmitted by one or more wireless network devices 910a-910e. In step 1108 it is determined whether all of the available wireless signals that are receivable by the mobile unit 102 have been accumulated. If not, the procedure returns to step 1106 in which scanning continues. If the wireless signal have been accumulated, the procedure 1100 continues to step 1110 in which measured parameters associated with each of the received wireless network signals are sent to the server 112. In step 1112, the server 112 determines whether the measured parameters are recognized as matching a wireless fingerprint associated with a registered set-top box. If not, the procedure returns to step 1106 in which scanning continues. If the measured parameters are recognized as matching a wireless fingerprint, the procedure continues to step 1114. In step 1114, the server 112 sends an acknowledgement to the mobile unit 102. In step 1116, the mobile unit 102 receives a control input from a user which includes a command for the set-top box associated with the matched wireless fingerprint to perform a function such as changing a volume, changing a channel, or initiating playback of multimedia. In step 1118, an action is initiated in response to the control input. The procedure then returns to the start.

Figure 12:
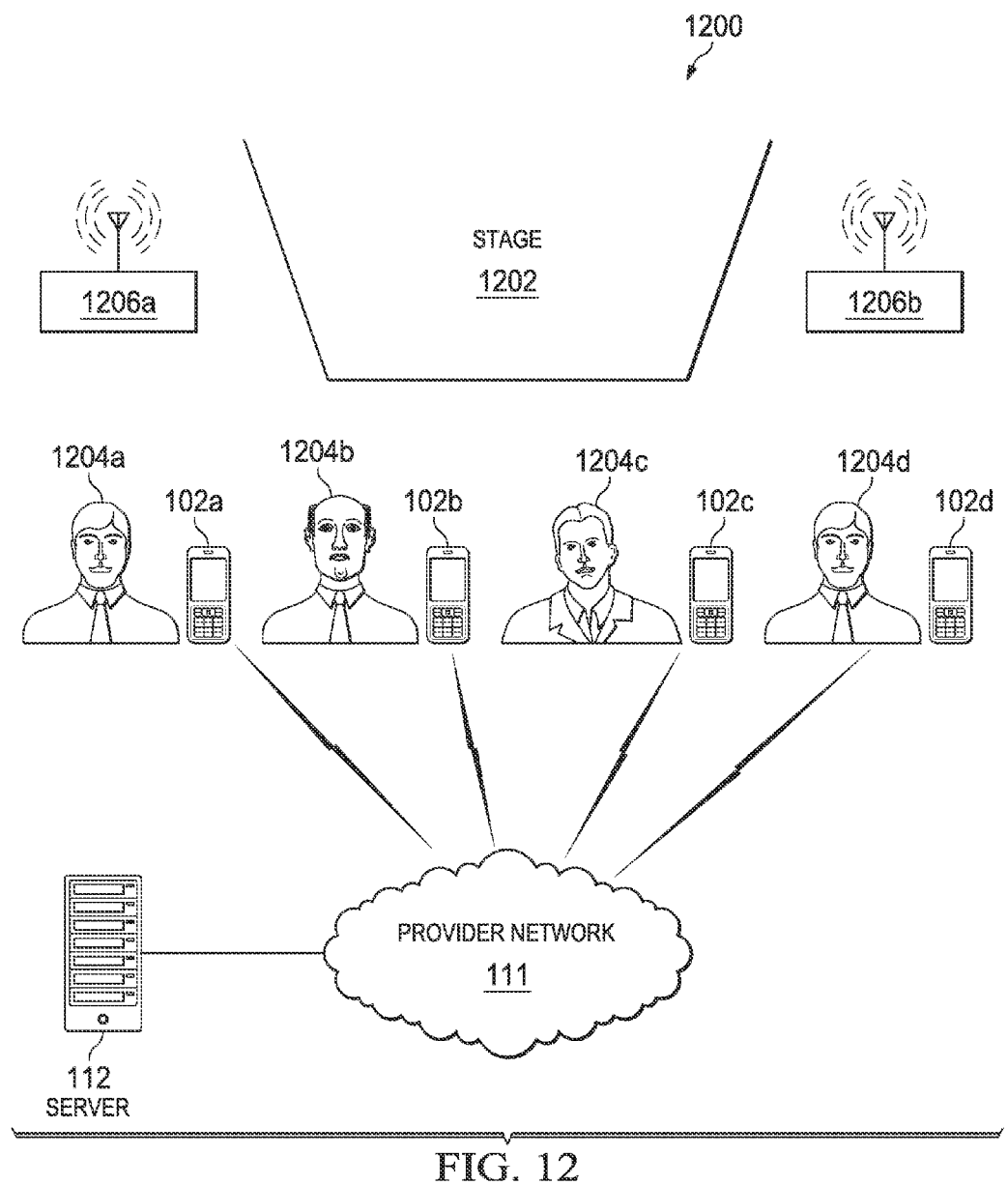
FIG. 12 illustrates an embodiment of a system for determining a relative location of one or more mobile devices based upon scanned wireless fingerprints within an environment.

FIG. 12 illustrates an embodiment of a system for determining a relative location of one or more mobile devices based upon scanned wireless fingerprints within an environment 1200. In the particular embodiment illustrated in FIG. 12, the environment 1200 is a concert event environment having a stage 1202. A number of mobile units 102a-102d, each associated with a respective user 1204a-1204d, are disposed within the environment 1200. The environment 1200 further includes wireless network devices 1206a-1206b each configured to transmit one or more RF signals within the environment. In a particular embodiment, the wireless network devices 1206a-1206b are wireless base stations. In various embodiments, at least one of the wireless network devices 1206a-1206b is fixed at a known location. Each of the mobile units 102a-102d are in communication with a server 112 via a provider network 111. The server 112 includes a database for storing various wireless fingerprints such as the wireless fingerprints previously described herein that have been previously scanned by various devices such as the mobile units 102a-102d. The server 112 further functions to determine a relative proximate location of one or more of the mobile units 102a-102d based upon two or more different wireless fingerprints. In some embodiments, the relative location is the relative location of a mobile unit 102a-102d with respect to a known location. In still other embodiments, the relative location is the location of one of the mobile unit 102a-102d with respect to another of the mobile units 102a-102d.

In operation, one or more of the mobile units 102a-102d scans an area of the environment 1200 for wireless signals receivable by the particular mobile unit 102a-102d at a particular time to capture a wireless fingerprint. The mobile units 102a-102d then send the respective wireless fingerprints to the server 112. Based upon the wireless fingerprints as well as the time of arrival of each of the wireless fingerprints, the server 112 determines the position of one or more of the mobile units 102a-102d in relation to a known fixed point such as the wireless network device 1206a. In a particular example, a mobile unit 102a scans the environment 1200 and detects one or more wireless signals transmitted by wireless devices in the environment. For example, the first mobile unit 102a may scan the environment and detect WiFi signals from the wireless network devices 1206a-1206b, and Bluetooth signals from mobile unit 102b and mobile unit 102c. The mobile unit 102a then sends information regarding device IDs and the signal strength of each of these signals representing a first wireless fingerprint as well as the time of measurement to the server 112. The mobile unit 102d may also scan the environment and detect the Wifi signals from the wireless network devices 1206a-1206b as well as a Bluetooth signal from mobile unit 102c. The mobile unit 102d then sends information regarding device IDs and the signal strength of each of these signals representing a second wireless fingerprint as well as the time of measurement to the server 112. It should be understood that other mobile units 102b and 102c may also send wireless fingerprints to the server 112.

The server 112 then uses overlapping fingerprint information from the first and second fingerprints and the timestamps of each of the first and second wireless fingerprints to determine the location of either of mobile unit 102a or mobile unit 102d relative to the known location of the wireless network device 1206a, or alternately the distance between mobile unit 102a or mobile unit 102d. The server 112 may then send the location information to one or more of mobile unit 102a or mobile unit 102d. Mobile unit 102a or mobile unit 102d may then use the location information to perform some action. For example, the mobile unit 102a may inform the user 1209a that a known friend who is the user 1204d of mobile unit 102d is nearby. In still another embodiment, one or more of the users 1204a-1204d may user their respective mobile units 102a-102d to take pictures or videos during the concert event. Using the locations of each of the mobile units 102a-102d determined by the capturing of wireless fingerprints, the server 112 can determine the location within the environment 1200 that a particular picture or video was taken at a particular time and aggregate a plurality of pictures into a recreation of the concert.

Figure 13:
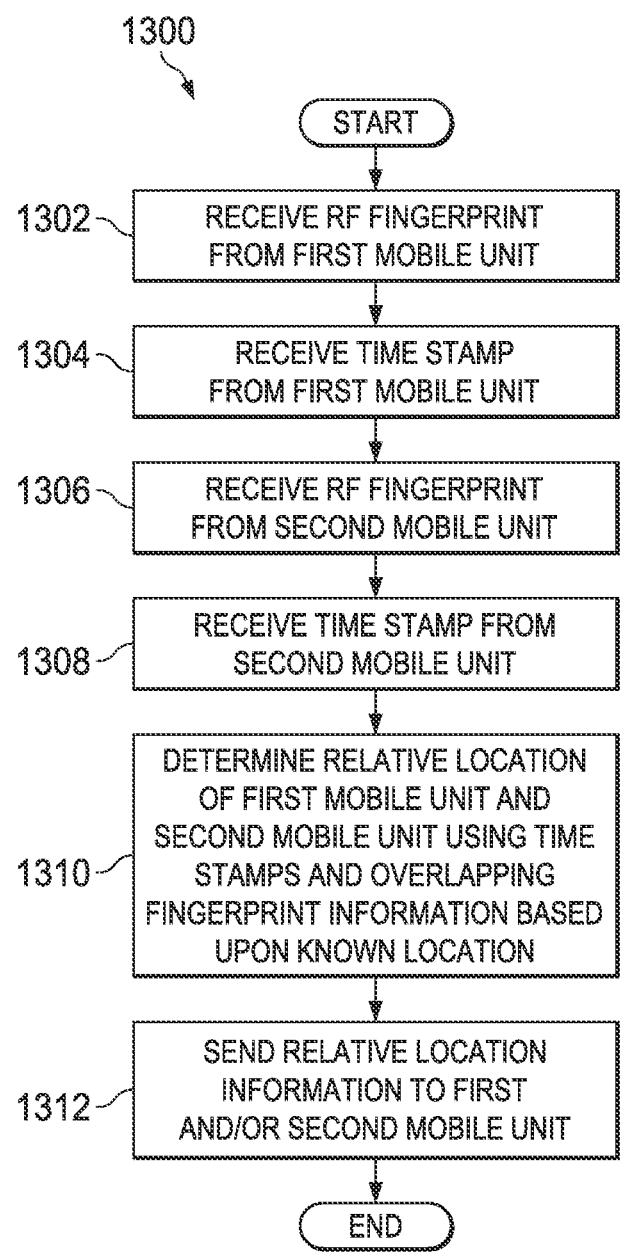
FIG. 13 illustrates an embodiment of a procedure for determining a relative location of a mobile unit by a server.

FIG. 13 illustrates an embodiment of a procedure 1300 for determining a relative proximate location of a mobile unit by a server. In step 1302, the server 112 receives a first wireless RF fingerprint from a first mobile unit 102a. The first mobile unit 102a obtains the wireless fingerprint by scanning for the presence of RF signals or network device IDs from multiple frequency bands in its proximity including cellular, Bluetooth and WiFi frequency bands. In step 1304, the server 112 receives a first time stamp from the first mobile unit 102a indicative of a time at which the first wireless fingerprint was obtained by the first mobile unit 102a. At step 1306, the server 112 receives a second wireless RF signals or network device IDs as a fingerprint from a second mobile unit 102d. The second mobile unit 102d obtains the wireless fingerprint by scanning for the presence of RF signals from multiple frequency bands in its proximity including cellular, Bluetooth and WiFi frequency bands. In step 1308, the server 112 receives a second time stamp from the second mobile unit 102d indicative of a time at which the second wireless fingerprint was obtained by the second mobile unit 102d.

In step 1310, the server 112 determines the relative position of the first mobile unit 102a and/or the second mobile unit 102d using overlapping fingerprint information obtained from the first wireless fingerprint and the second wireless fingerprint as well as the first time stamp and the second time stamp based upon a known location. Using the relative strengths of the common wireless signals obtained by each of the first mobile unit 102a and the second mobile unit 102d forming the first and second wireless fingerprints and the time of reception of such wireless signals, the server 112 can determine a relative location of the first mobile unit 102a and the second mobile unit 102d. This relative location may be the location of the first mobile unit 102a and the second mobile unit 102d with respect to a known location, such as the location of a wireless access point. For example, the first mobile unit 102a and the second mobile unit 102d may each obtain wireless fingerprints which include one or more signals from the wireless network device 1206a in which the wireless network device 1206a has a known location. Since the first mobile unit 102a is closer to the wireless network device 1206a than the second mobile unit 102d, the signal strength of a signal from the wireless network device 1206a is likely to be greater when received by at approximately the same time by the first mobile unit 102a than the second mobile unit 102d. Using this information as well as the signal strengths, identities, and time of reception of other wireless signals that make up a wireless fingerprint, the server 112 may determine the location of the first mobile unit 102a and the second mobile unit 102d relative to the wireless network device 1206a. Accordingly, the distance between the first mobile unit 102a and the second mobile unit 102d may be determined by the server 112.

In step 1312, the server 112 sends the relative location information to the first mobile unit 102a and/or the second mobile unit 102d. The first mobile unit 102a and the second mobile unit 102d may then perform some action based upon this relative location information. For example, as an alternative to the server 112 determining the distance between the first mobile unit 102a and the second mobile unit 102d, the distance between the first mobile unit 102a and the second mobile unit 102d may be determined by the first mobile unit 102a or the second mobile unit 102d. In at least one embodiment, the first mobile unit 102a may alert the user 1209a of the presence of the user 1204d associated with the second mobile unit 102d when the distance between the first mobile unit 102a and the second mobile unit 102d is determined to be within a predetermined threshold distance.

Figure 14:
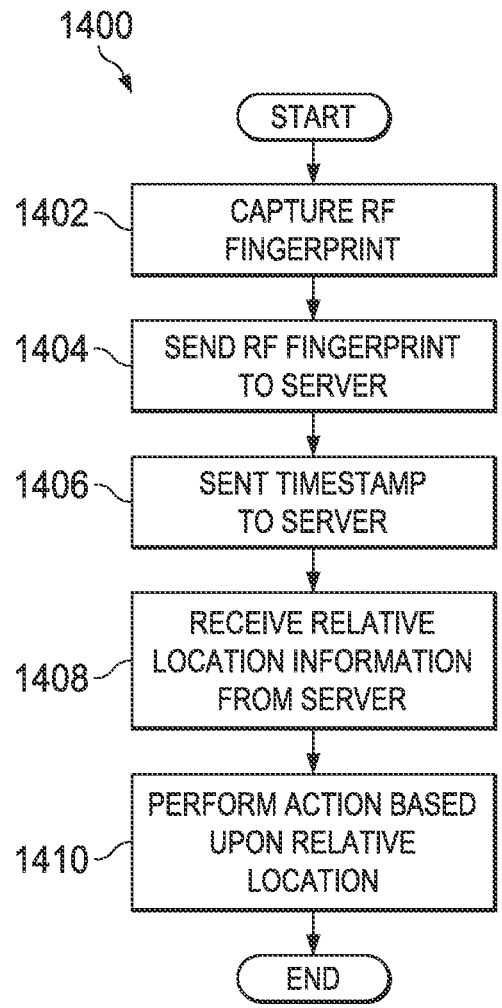
FIG. 14 illustrates an embodiment of a procedure for capturing a wireless fingerprint and performing a predetermined action based upon a determined relative location by a mobile unit.

FIG. 14 illustrates an embodiment of a procedure 1400 for capturing a wireless fingerprint and performing a predetermined action based upon a determined relative location by a mobile unit 102a. In step 1402, the mobile unit 102a captures an RF wireless fingerprint by scanning for the presence of RF signals from multiple frequency bands in its proximity including cellular, Bluetooth and WiFi frequency bands. In step 1404, the mobile unit 102a sends the RF wireless fingerprint to the server 112. In step 1406, the mobile unit 102a sends a time stamp to the server 112 indicative of a time at which the signals making up the wireless fingerprint where captured by the mobile unit 102a. The server 112 uses the wireless fingerprint and time stamp as well as other wireless fingerprints and timestamps obtained from other devices to determine relative location information indicative of a location of the mobile unit 102a relative to a known location such as a wireless access point. However, as will be disclosed in more detail hereinbelow, a known wireless fingerprint can be prestored. In step 1408, the mobile unit 102a receives the relative information from the server 112. In step 1410, the mobile unit 102a performs a predetermined action based upon the relative location information. As previously discussed, the predetermined action may include alerting the user 1209a of the mobile unit 102a of the presence of a user associated with another mobile unit when the distance between the first mobile unit 102a and the other mobile unit is determined to be within a predetermined threshold distance.

As noted hereinabove, when a given mobile device enters a particular "locale," it is possible that the proprietary application running on the mobile device will periodically scan for transmitting wireless devices to determine the community of wireless devices that it can receive broadcast information therefrom. A "locale" is defined as a bounded area that may have one or more wireless scannable devices disposed within such bounded area. Additionally, this bounded area is one in which actions for a mobile device may be appropriate, such as locating adjacent mobile devices at a concert, collecting information from mobile devices within the locale, etc.

Once within the "locale," the given mobile device will have potential access to a plurality of different types of wireless transmitting devices. As noted hereinabove, each of these wireless devices will transmit on a particular frequency requiring the given mobile device to have a radio for receiving that particular frequency and transmission type. For example, a Bluetooth device operates under the 802.11 IEEE standard, which is also used for WiFi, this all being referred to as the standard for implementing the wireless local area network (WLAN). The standard operates in multiple frequency bands, 2.4, 3.6 and 5 GHz frequency bands. The 2.4 GHz frequency band is the typical one that is found. Typically, there will be provided on most mobile devices the ability to interface with WiFi hubs via one radio and Bluetooth devices via a second radio. Additionally, there may be a low power radio operating on the 802.15.4 standard. This standard is typically used with the ZigBee type of application. These are typically transmitters that will be associated with personal area networks. There may also be the possibility of detecting a near field communication (NFC) transmitter. Although these types of devices require proximity of no more than a few centimeters, they do provide an identifier that can be detected with an NFC device associated with the particular mobile device.

Once the given mobile device (such as a smart phone) has entered the overall locale, it can detect the transmissions broadcast from the ones of the wireless devices within the locale that are within its receiving range. For example, when a given mobile device is on the edge of a locale, it can only receive a portion of the broadcasts of all of the wireless devices within the locale. Therefore, only a portion of the broadcasting wireless devices within the locale will be within its receiving range, depending on the size of the locale and the dispersement of the various wireless units. For example, in a concert environment, it is possible that a plurality of Bluetooth devices associated with such things as head phones and the such or personal computing devices carried by individuals within the concert locale can be distributed throughout the locale, defined as the bounded area of the concert hall. All of these can be scanned and received by the given mobile device and made part of its fingerprint at a given point in time and at a given position, noting that a change in position or even a lapse of time may result in the wireless fingerprint changing.

In order to further define a particular locale to the server, there can be provided a plurality of fixed wireless devices such as standalone Bluetooth LE emitters or WiFi hubs, these sometimes referred to as "beacons." These fixed devices will have a known or predetermined and fixed ID or MAC address that is known by a server. When this information in the form of imbedded information imbedded in a created wireless fingerprint by the given mobile device is transmitted back to a server, the server can detect the existence of the specific ID and, as such, it will then know that a particular mobile device is within the locale defined by the given mobile device being within the receiving range of the one or more fixed wireless devices associated with the locale just dude to the fact that the beacon is embedded in their current wireless fingerprint. The reason for this is that this particular fixed wireless device has a unique address. Although a WiFi hub could be utilized, there is also the possibility of, for example, a ZigBee 802.15.4 device to be used as just a simple locator or beacon to transmit its information. Additionally, there could be a Bluetooth device provided for that purpose. The difference is that the Bluetooth device has a smaller transmission range as compared to an 802.15.4 device or the WiFi hub. Also, the locale could be defined at the server to be associated with a given mobile device when one or more of the fixed wireless devices are within it's reception range or when there is an overlap of wireless fingerprints and one of the wireless fingerprints has associated therewith one or more of the fixed wireless devices.

The overall purpose of this beacon is to provide to the server the ability to determine "presence" of a fingerprint in its database. Alternative to the beacon is some point of reference fingerprint. This is facilitated by an individual, for example, going to the locale and then walking around the locale and taking a fingerprint and sending to the server with some indication of the event. This is in effect "registering" the fingerprint in such a manner that it is associated with the event. All the server needs is some frame of reference. Also, as more mobile devices enter the locale and the server determines there is an overlap with a sufficient number of the wireless devices, other new wireless devices not originally in the registered" or frame of reference wireless fingerprint can be added. What the server is doing is dynamically creating a database of fingerprints that are known statistically to be in the locale. It could be that the registered or frame of reference fingerprint only covers a small portion of the locale (when referring to the locale from the standpoint of the server, it is defined in terms of the wireless devices that actually define to the server the "presence" of some mobile device in an environment of wireless devices and not necessarily the actual physical boundaries). If, in this example, the frame of reference only covers a small portion of the locale, this will be to the server the definition of the local initially. As other devices move into this locale, they may be on the fringe and pick up more distant (both physically and magnetically—receive range is different) than the original mobile device used as the frame of reference. Thus, this is a dynamically changing locale.

When the server receives any wireless fingerprint from a given mobile device, it stores this fingerprint and then compares this wireless fingerprint with pre stored fingerprints in the database. If there is a beacon in the wireless fingerprint, then this can act as sort of an index for the locale. If not, then the server must search against the entire database using well known search algorithms. However, since each wireless device that makes up the wireless fingerprint has a unique ID, this will allow all stored wireless fingerprints to be pulled up quickly.

Figure 15:
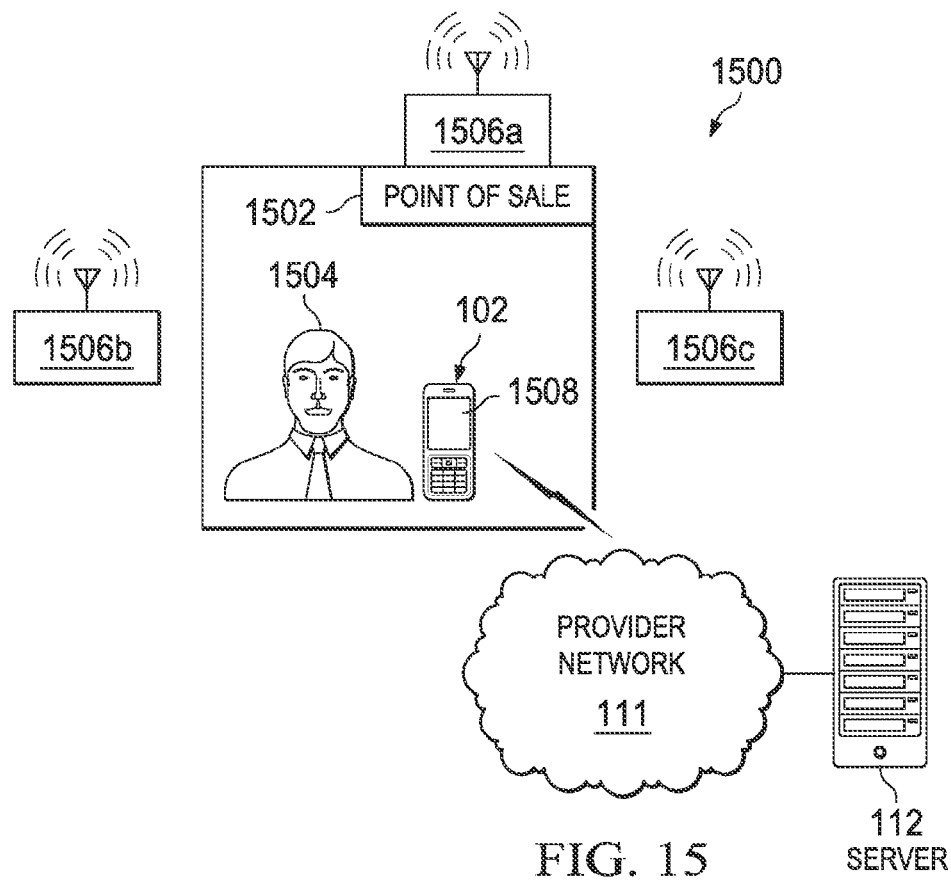
FIG. 15 illustrates an embodiment of a system for authentication of a user transaction based upon scanned wireless signals.

FIG. 15 illustrates an embodiment of a system for authentication of a user transaction based upon scanned wireless signals. In the embodiment illustrated in FIG. 15, the system is operating within a retail environment 1500. The retail environment 1500 includes a point of sale (POS) terminal 1502 from which a customer 1504 may perform a retail transaction such as purchasing of a product. In particular embodiments, the point of sale terminal includes a cash register from which the customer 1504 may make a cash, credit, or debit payment. Although not illustrated in FIG. 15, it should be understood that in various embodiments the point of sale terminal 1502 is connected to a network through which customer transactions using the point of sale terminal 1502 may be authorized and completed.

In the embodiment illustrated in FIG. 15, the customer 1504 has a mobile unit 102 having an authentication application 1508 stored within memory and executable by the mobile unit 102. In some embodiments, the authentication application 1508 is a banking application. In some embodiments, the authentication application 1508 logs the wireless fingerprint of locations where the customer 1504 is currently disposed, and sends the wireless fingerprint determined at that location at that point in time to the server 112 via the provider network 111, or alternately to a third-party server, to authenticate the presence of the customer 1504 using both a first factor of security associated with login information obtained from a customer 1504, and a second factor of security associated with the location of the customer 1504. For example, login information may be obtained by the customer 1504 inserting a credit card or debit card into the point of sale terminal 1502, and location information may be obtained by the mobile unit 102 scanning for a wireless fingerprint associated with the particular location of the point of sale terminal 1502.

During a transaction with the customer 1504 via the point of sale terminal 1502, the authentication application provides for a first and a second level of authentication of the transaction with the customer 1504. In various embodiments, prior to beginning a transaction, or alternately after the transaction is rejected, the customer 1504 executes the authentication application 1508, and enters login information using the authentication application. The mobile unit 102 then sends the login information to the server 112 via the provider network 111. In an alternative embodiment, the login information may be provided to the point of sale terminal 1502 instead of the authentication application 1508. For example, login information may be provided by the customer 1504 inserting a debit card or credit card into the point of sale terminal 1502. The authentication application 1508 then scans for wireless signals receivable at the current location of the mobile unit 102. After completion of the scanning operation, the authentication application forms a wireless fingerprint based upon the received wireless signals, and the mobile unit 102 sends this wireless fingerprint to the server 112. The server 112 then determines whether the customer 1504 is authenticated based upon the login information entered into the authentication application 1508. This acts as a first level (or first factor) of authentication. If the login information is not authenticated, the transaction is rejected. If the login information is authenticated, the server 112 next determines whether the wireless fingerprint received from the mobile unit 102 substantially matches a known wireless fingerprint corresponding to the present location of the mobile unit 102. This acts as a second level (or second factor) of authentication for the customer transaction. If the received wireless fingerprint matches the known wireless fingerprint, the server 112 authenticates the wireless fingerprint and the customer transaction is completed. However, if the received wireless fingerprint does not match a known wireless fingerprint for the present location of the mobile unit 102, the customer transaction is rejected.

In existing systems, when a customer travels between locations and attempts transactions too frequently his or her credit card may be "shut off" due to fraud preventative measures. This results in the customer being unable to user their card at that location. In various embodiments of the disclosed embodiment, the customer can load the authentication application 1508, enter a PIN or other identifying information, and authenticate the present location using or more of a GPS location, WiFi, or other signals without having to call into the bank to "unlock" his or her card. In some embodiments, after authentication the customer may then use the card in the point of sale terminal 1502 a second time and be allowed to complete the transaction.

Figure 16:
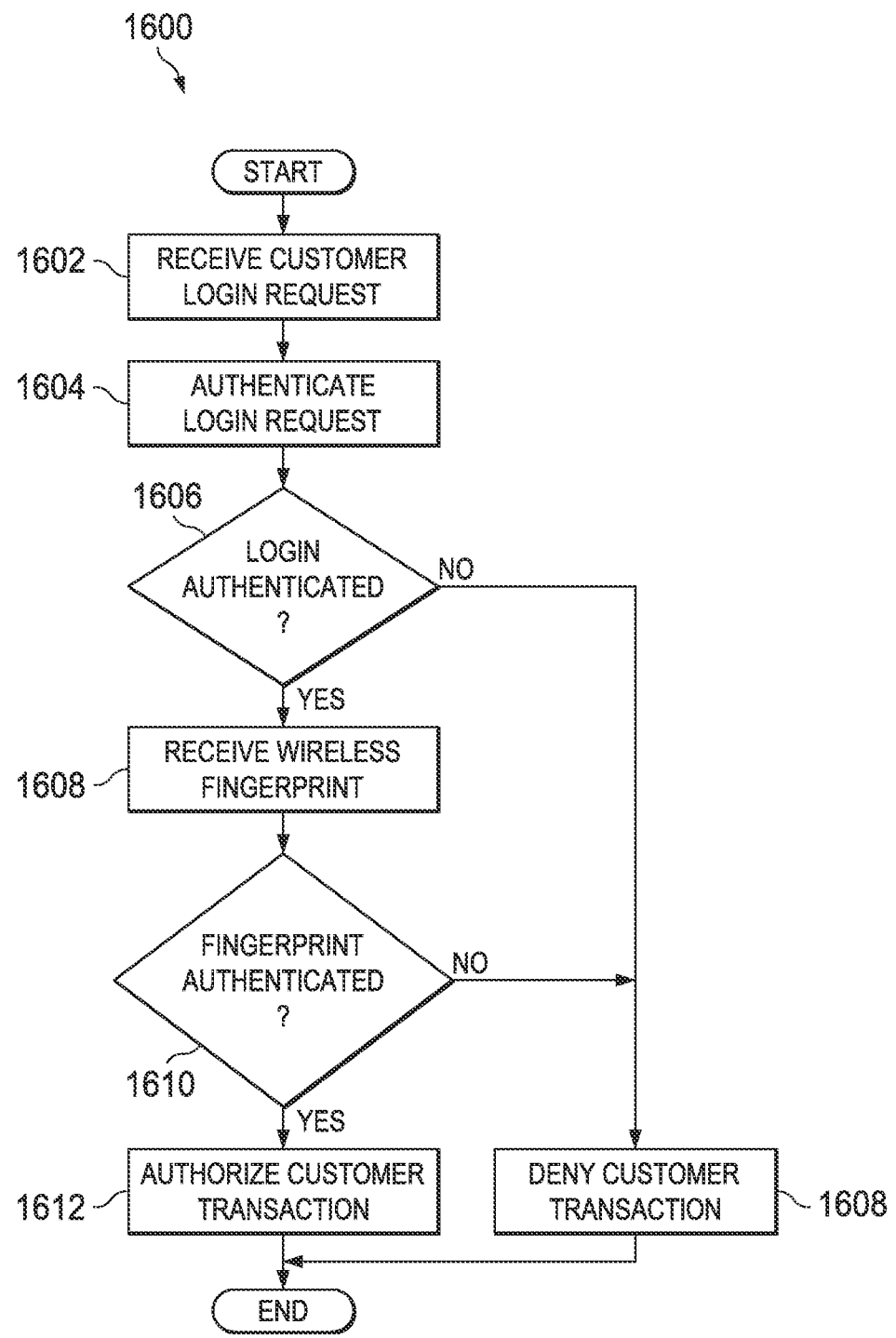
FIG. 16 illustrates an embodiment of a procedure for authentication of a user transaction by a server.

FIG. 16 illustrates an embodiment of a procedure 1600 for authentication of a user transaction by the server 112. In step 1602, the server 112 receives a customer login request 1602 from the customer 1504. In one embodiment, the customer may send the login request using the authentication application 1508 with mobile unit 102. In still another embodiment, the login request is initiated by the customer at the point of sale terminal 1502. In step 1604, the server 112 initiates a process to authenticate the login request. In step 1606, the server determines whether the login is authenticated. If the login request is not authenticated, the procedure continues to step 1608 in which the server 112 denies the customer transaction. If it is determined that the login request is authenticated, the procedure continues to step 1608 in which the server 112 receives a wireless fingerprint from the mobile unit 102. In various embodiments, the received wireless fingerprint is obtained by the mobile unit 102 scanning for the presence of wireless signals within the vicinity of the present location of the mobile unit 102. In various embodiments, the wireless fingerprint may include MAC addresses or other identifiers as well as signal strength measurements of one or more of the wireless signals scanned by the mobile unit 102.

In step 1610, the server 112 determines whether the wireless fingerprint is authenticated by determining whether the received wireless fingerprint substantially matches a stored wireless fingerprint corresponding to the present location of the customer 1504. It should be understood that a "matching" wireless fingerprint need to be an exact match, but may be a received wireless fingerprint that matches a stored wireless fingerprint at an acceptable level or as determined via heuristics. If it is determined in step 1610 that the wireless fingerprint is not authenticated, the procedure continues to step 1608 in which the customer transaction is denied 112 and the procedure ends. If it is determined in step 1610 that the wireless fingerprint is authenticated, the procedure continues to step 1612 in which the customer transaction is authorized by the server 112 and the procedure ends. Although in the embodiment described in FIG. 16, the authentication procedure is performed by the server 112, it should be understood that in other embodiments the authentication procedure may be performed by a third-party server.

Figure 17:
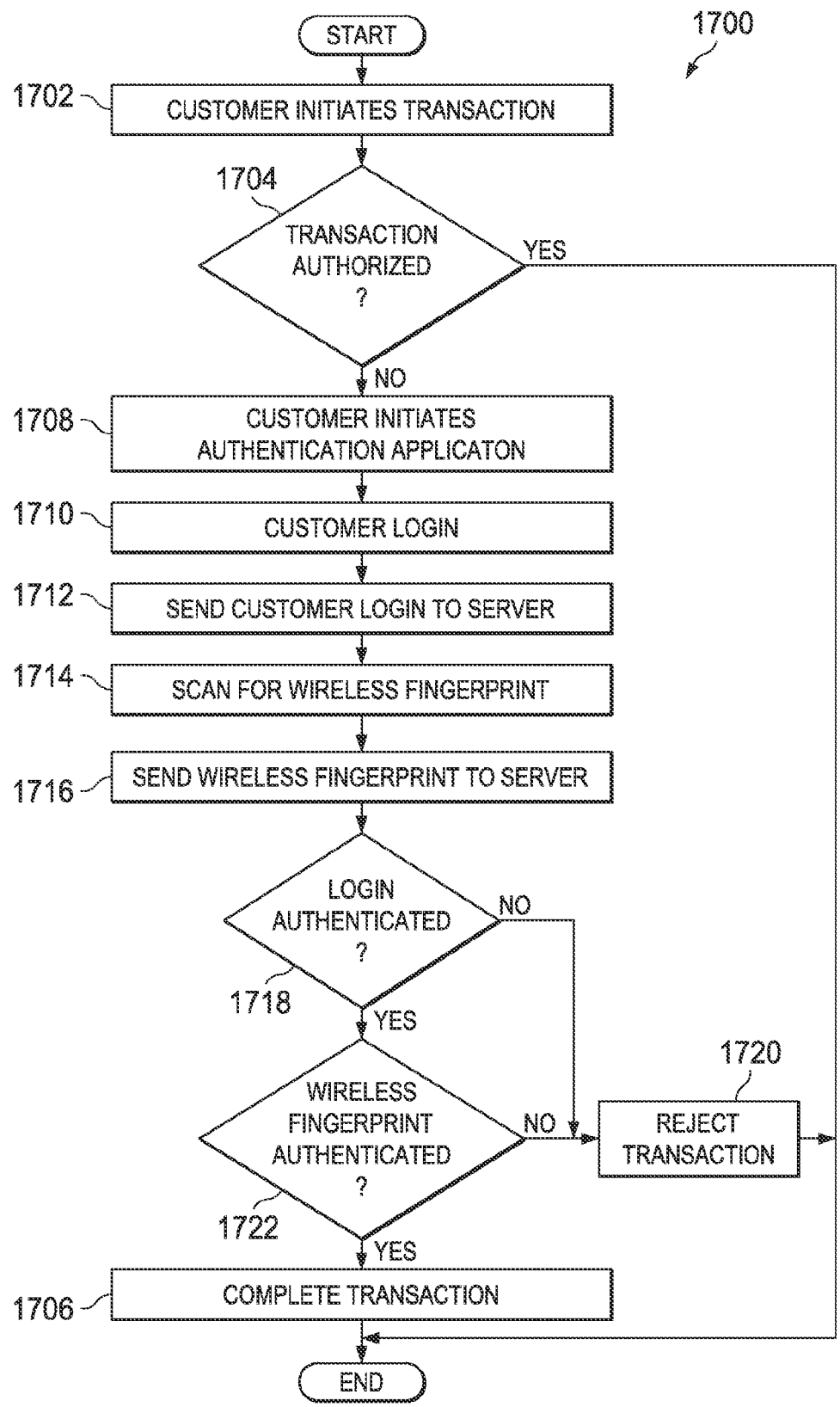
FIG. 17 illustrates an embodiment of a procedure for authentication of a user transaction by a mobile unit using an authentication application.

FIG. 17 illustrates an embodiment of a procedure 1700 for authentication of a user transaction by the mobile unit 102 using the authentication application 1508. In step 1702, a customer 1504 initiates a transaction at a point of sale terminal 1502. In step 1704, a determination is made regarding whether the transaction is authorized. In a particular embodiment, the authorization of the transaction may be performed at the point of sale terminal 1502. If the transaction is authorized in step 1704, the procedure continues to step 1706 in which the transaction is completed and the procedure ends. However, if it is determined in step 1704 that the transaction is not authorized, the procedure continues to step 1708. An example of a situation in which the transaction may not be authorized includes if the nature of the transaction triggers an anti-fraud measure that prevents the transaction from being completed.

In step 1708, the customer 1504 initiates the authentication application 1508 using the mobile unit 102. In a particular embodiment, authentication application 1508 may be a banking application associated with a particular financial institution that is an issuer of a particular credit card or debit card. In other embodiments, the authentication application 1508 may be a banking application that may be used to interact with a plurality of financial institutions. In step 1710, the authentication application 1508 provides a login procedure to the customer 1504 so that the customer can enter login information as a first factor of authentication. In step 1712, the authentication application 1508 sends the login information to the server 112. In step 1714, the authentication application 1508 causes the mobile unit 102 to scan for wireless signals to generate a wireless fingerprint. In step 1716, the authentication application 1508 causes the mobile unit to send the wireless fingerprint to the server 112.

In step 1718, the authentication application 1508 receives an indication from the server regarding whether the login information provided by the customer 1504 in step 1710 is authenticated. If it is determined in step 1718 that the login information is not authenticated, the procedure continues to step 1720 in which the transaction is rejected and the procedure ends. If it is determined in step 1718 that the login information is authenticated, the procedure continues to step 1722 in which the authentication application 1508 receives an indication from the server 112 regarding whether the wireless fingerprint is authenticated. If the wireless fingerprint is not authenticated, the procedure continues to step 1720 in which the transaction is rejected and the procedure ends. If the wireless fingerprint is authenticated, the procedure continues to step 1706 in which the transaction is completed and the procedure ends.

Figure 18:
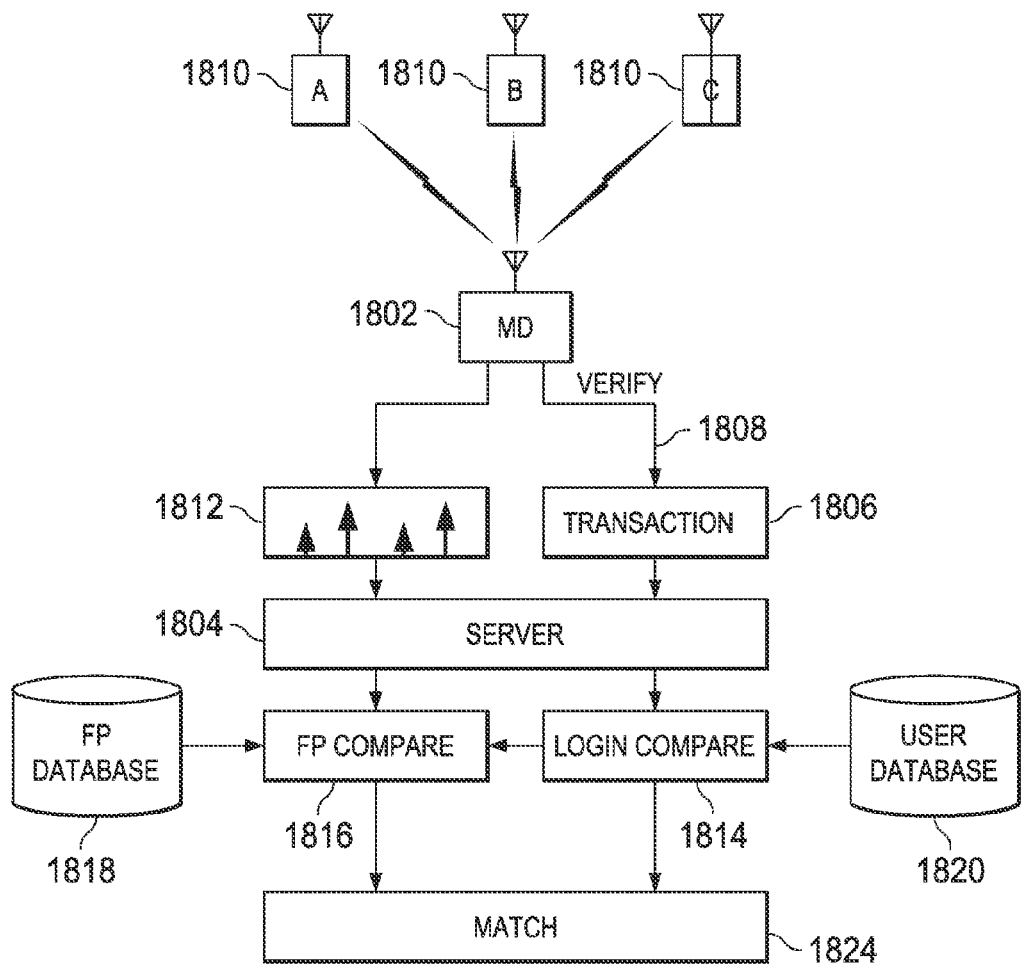
FIG. 18 illustrates an overall diagrammatic view of the transaction details and the flow between the mobile device and the server.

Referring now to FIG. 18, there is illustrated a diagrammatic view of the overall transaction flow between a mobile device 1802 and a server 1804. The mobile device and the server could be disposed at a common location or they can be disposed at any remote location. All that is important is that the mobile device 1802 can communicate with the server. The mobile device 1802 is disposed within an environment wherein a transaction of some type is required, and this transaction is of the type that must be verified. As noted hereinabove, there are two types of verifications, the first one being the verification normally associated with a transaction, i.e., login and some kind of identification information, and the other type being a verification of the mobile device actually being present and running in application at the location of the transaction. The transaction, in one embodiment of the disclosure, is a transaction that is "fingerprint" verified, i.e., it requires the fingerprint verification. This will be some type of transaction that requires it to be initiated in this mode so a remote transaction can be conducted in a manner requiring the fingerprint for verification against other known stored fingerprints.

The transaction is illustrated by a block 1806. This could be a point of sale terminal (POS) or any type of transaction requiring the transaction to be performed at a particular location. The transaction, such as a credit card transaction, could be conducted at the POS wherein the POS would conduct the normal transaction by first allowing the user to select the transaction to be conducted under the fingerprint enhanced transaction option provided by the transaction provider, such as the kiosk operator. This operation presents to the user the option of using such enhanced operation followed by input of the identifying information from the user, illustrated by an arrow 1808, and then processing of this information in the normal manner. If this were a credit card transaction, credit card information would be taken and forwarded to the server 1804. It could in fact be a device utilizing a near field communication (NFC) type of connection. In any event, the user of the mobile device 1802 would either use a mobile device as the device to transmit the user information or the user would input the information via credit card or other technique or other method.

What is important is that somehow the transaction, being financial or whatever, is conducted in such a manner that it requires verification of the login information and the such with the server 1804. There could in fact be biometrics involved wherein a hand scan, a retinal scan or even a fingerprint is required by the server 1804 as part of the normal transaction. There are kiosks and the such which require these type of transactions such as when an individual walks up to a kiosk and attempts to withdraw money or conduct some type of financial transaction. The kiosks will typically require some type of card input followed by the PIN, some type of biometric information possibly or the such. This is a transaction that is required for the user to actually initiate and complete a transaction at the block 1806 without the fingerprint enhanced option or requirement. Without the second level of verification required as described hereinabove, this would be the only required information to complete the transaction. As noted hereinabove, there are certain situations such as fraud and the such wherein an alert would be triggered and the transaction might in fact be denied without some intervention by the user and then the transaction switched to a fingerprint enhanced transaction with or without the input of the user. In the fingerprint enhanced operation, however, there is a requirement that the mobile device of the user be recognized. In one embodiment, the kiosk by way of example would have the ability to recognize the MAC address of the mobile device such as a smart phone and broadcast this to the server 1804. In this manner, the server will have knowledge of a communication path to the device.

As noted hereinabove, the second level of verification is one that is associated with the general or possibly even specific locale wherein the transaction is performed, and further, has a time aspect to it such that the second level of verification is done confirming that the person, via their mobile device, is proximate to the transaction being carried out and that the transaction is being conducted in a particular locale. This is facilitated via scanning a plurality of devices 1810 disposed within the environment wherein the transaction is being performed. These devices 1810 may be fixed devices or they may be mobile devices that may just happen to be in the environment at the time that the mobile device 1802 scans their output to create a fingerprint 1812. There may even be a fixed wireless device or "beacon" provided in the location where the transaction is "expected" to be conducted. The fingerprint 1812 represents the status of the environment at a point in time. This point of time is typically that associated with the location and the time of the transaction. There will be an application running on the mobile device 1802 that will be associated with the transaction being performed.

Thus, when the transaction is initiated or performed, the application on the mobile device 1802 is synchronized with that transaction running on the kiosk or the such in that the kiosk identifies the mobile device 1802 via receipt of its MAC address or other identifying information such that the fingerprint 1812 will be sent to the server 1804. This could be via a different path completely than that associated with the transaction. For example, there may be a kiosk associated with the transaction, and, when the mobile device and the person initiate the transaction, the user selects the fingerprint enhanced transaction, the mobile device identifies itself to the kiosk and the user enters their information. It could be that the transaction actually takes place on a device 1802 and the operating application thereon via some type of banking application. This way the transaction and the fingerprint are all controlled by the mobile application. In any event, what is necessary is that the verification information for the transaction be sent to the server, and, proximate in time thereto, a fingerprint from the mobile device 1802 running the application be sent to the server 1804. Further, it may be that it is the fingerprint of the kiosk that is sent as well as the fingerprint of the mobile device and both used to determine a "presence" in a defined environment in order to verify that presence.

At the server 1804, there are two operations performed. The first is to determine if the transaction is valid, i.e. there is an appropriate login, i.e., biometrics, etcetera provided to the server 1804 in order to verify that this is in fact a valid transaction but for the comparison of the fingerprint. The transaction may in fact require absolutely at all times that the fingerprint be verified for its location. In other situations, it may be that the server 1804, after verifying that the login information is correct but having some rule that is executed stating that the fingerprint must be transmitted for further verification. The login compare is done at a block 1814 and information from the login is provided to a fingerprint compare block 1816. Since there are a large number of fingerprints that are stored in a fingerprint database 1818, there must be some type of filtering to only look for fingerprints that may be in the locale of the transaction.

For example, there may be a fixed transmission device, i.e., beacon, that is in the environment that can be utilized to filter out all the fingerprints such that only fingerprints with that particular fixed ID in it are utilized for the comparison purposes. Thus, when the login 1814 via a user database 1820 confirms that it is a valid login, i.e. the person appears to be who they say they are, then this information is passed to the fingerprint compare block 1816 to possibly filter the number of fingerprints to be compared based on receipt of the beacon in a fingerprint. Fingerprints are compared from the stored database to the currently received fingerprint 1812 and the requirement is that a match exists, i.e., the transaction is apparently taking place at a location previously associated with a stored known fingerprint via receipt of the beacon or the such and also, there is some communication with the mobile device associated with the person providing the login information and, thus, the person conducting the transaction. This will verify that the transaction is valid, as indicated by block 1824. Once it is determined that a match occurs, then information can be sent back to the transaction locale to complete the transaction.

To summarize the steps of the operation, the mobile device enters the physical locale of the transaction where it is possible to scan for wireless devices and a fingerprint can be created. The user then selects the transaction from an application running on the transaction device or on the mobile device. In this manner, the user has selected a fingerprint augmented transaction. User information in the form of login ID and password, biometrics, etc., are sent to the server. At the same time, a fingerprint is created (it may have been created previously, but temporarily close in time) by either the mobile device or a transaction terminal such as a kiosk. Both the login information and fingerprint are sent to the server. The server then determines if the received fingerprint substantially matches stored information. If so, then a determination is made that there is a valid "presence" of the mobile device at a known transaction locale. The received fingerprint provides this indication of a valid presence in that it has certain identifiers such as the transmission characteristics of one or more wireless devices known to be at the location of the transaction. It may be that it is known previously that there are three wireless devices, all beacons or even unknown devices that have a particular physical relationship to the transaction device such as a kiosk. For example, there may be a strong RF signal in close proximity and two others with weal RSSs and it is the identifiers of these three devises and their RSSs that make up the fingerprint portion that is uniquely required by the server to verify the transaction presence. Keep in mind that the presence of a person in the environment or other factors may cause a perturbation in the RSSs of any device, so there may be a slight variation is signal strength received from any one device, so it is a "substantial" match that is required for the verification operation. If, however, it is determined that the presence cannot be verified, the system can then push a notification to the user's mobile device requesting a PIN in order to complete the transaction.

Consider an alternative mode of operation. A user goes up to a kiosk and the only transaction carried out is that the user's device is recognized and that there is a valid fingerprint, thus requiring no additional information to be input. In this mode, the transaction device can generate a fingerprint associated therewith including the ID information of the mobile device or the mobile device can create the fingerprint that is present at the transaction location. With just this fingerprint, and knowledge of the mobile device being associated with the fingerprint, the transaction can be verified.

Figure 19:
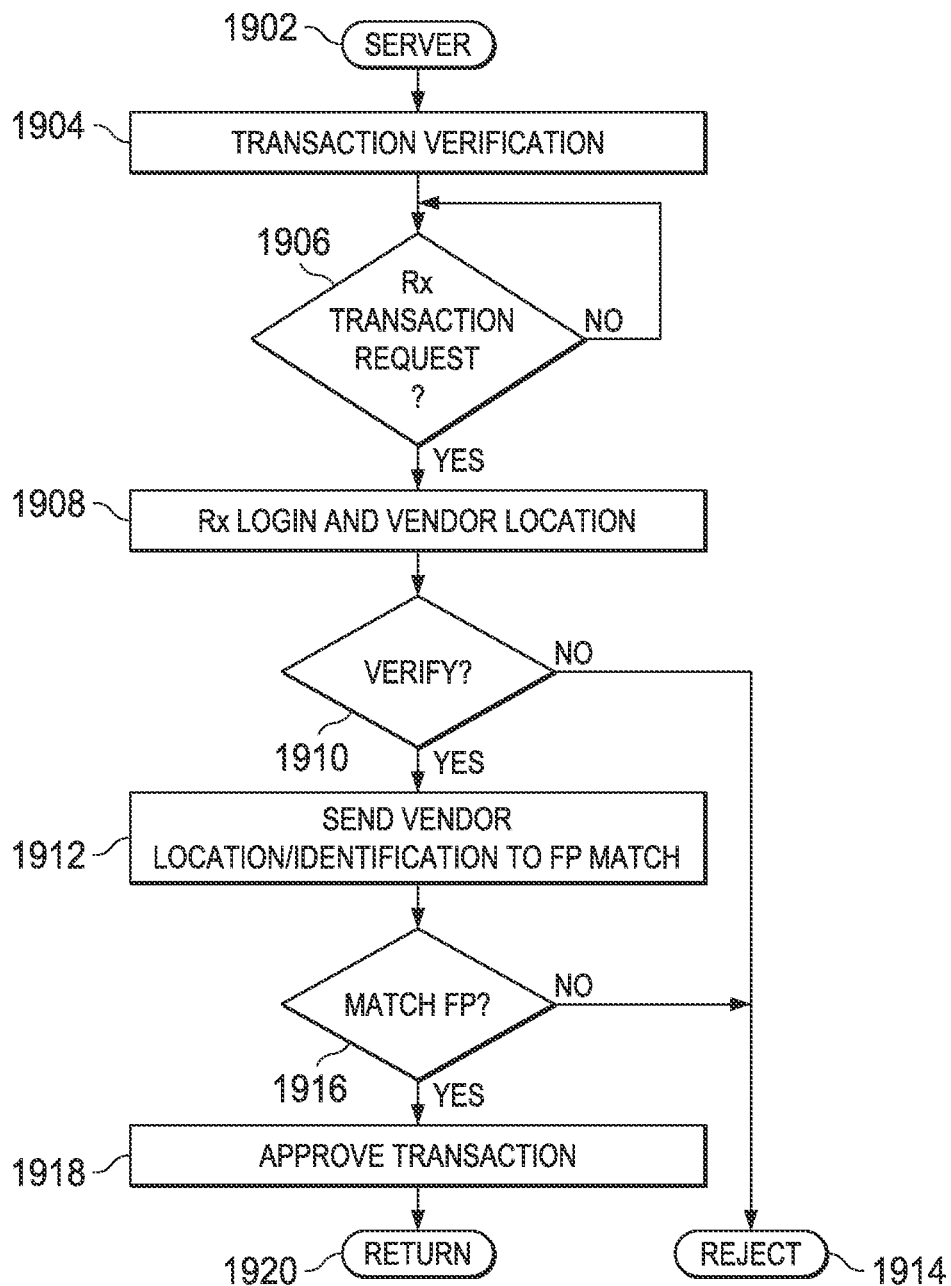
FIG. 19 illustrates a flowchart depicting the transaction operation at the server.

Referring now to FIG. 19, there is an illustrated flowchart depicting the operation at the server, which is initiated at a block 1902 and then proceeds to function block 1904 to perform the transaction verification. This, again, is the step that requires the normal transaction to be verified via information provided by the user or some device the user may have that is normally required for a verification without the second level of transaction, i.e., the fingerprint in an augmented fingerprint transaction. The program then proceeds to a function block 1906 to determine if a transaction request has been received, and if so, the program flows to a function block 1908 to receive the login and vendor location information. The vendor location information may merely be the ID of the vendor or the transaction hub such as a POS and the login information is the information received from the user or whatever device inputs information thereto. These logins can be complex and they are not described herein. However, this is a transaction wherein a server will require some handshake with the transaction locale determining the type of transaction, what is required for the transaction and verification of login and user ID information input by a user. The program then flows to a decision block 2010 to perform more verification operations. If the user database verifies that this particular information is valid as to login and user ID information, the program will flow along a "Y" path to function block 1912. If not, the program will reject the transaction at a block 1914.

At block 1912, the vendor location/ID information is sent to the fingerprint compare or match block 1818. This is a routine that will determine if the fingerprint does provide a match. The vendor location/ID information need not necessarily be sent if all of the fingerprints in the database are to be matched. However, the fingerprints that are matched must somehow be indexed to the transaction location, such as through a single fixed ID or beacon. If there is a match, that will be determined at a decision block 1916, with a no match routing the program to the reject block 1914 and a match routing the program to a block 2018 to approve the transaction and then to a block 1920 to return.

Figure 20:
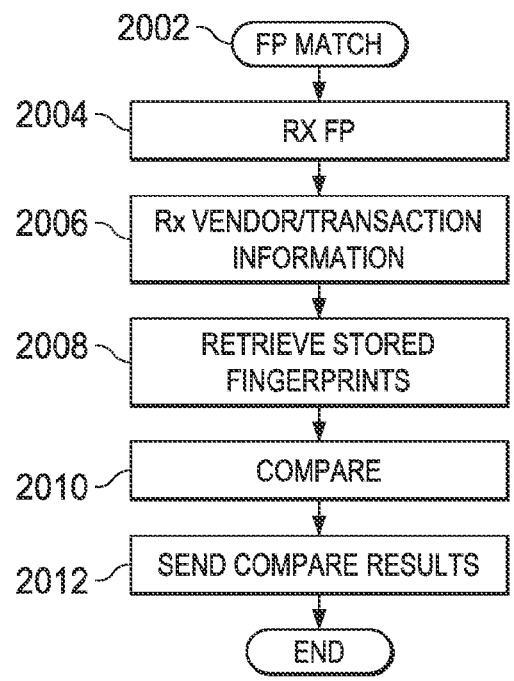
FIG. 20 illustrates the transaction operation at the mobile device.
Figure 21:
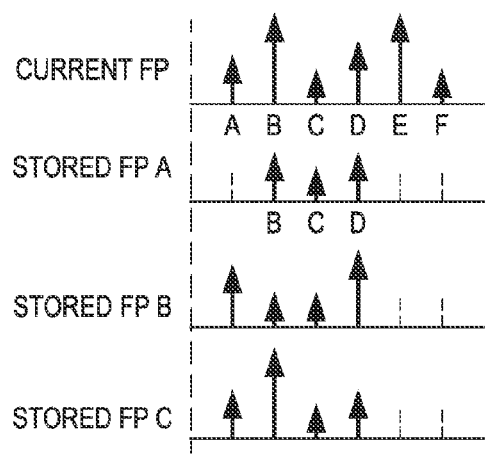
FIG. 21 illustrates the comparison between a received fingerprint and stored fingerprints.

Referring now to FIG. 20 there is illustrated a flowchart for the fingerprint match operation. The program is initiated at a block 2002 and then proceeds to block 2004 to receive the fingerprint that was generated by the mobile device via the scanning operation thereof or from the transaction device, this fingerprint only required to be generated in close physical proximity to the place where the transaction is expected to take place. What is noted here is that the fingerprint represents the expected presence of the transaction taking place in a certain locale. The fingerprint just needs to be generated in that locale proximate in time to the transaction and this can be generated by the mobile device, the transaction kiosk or even a dedicated fingerprint generator dispose din the locale. The program then flows to function block 2006 to receive the vendor/transaction information in order to determine if there is some type of index to the particular fingerprint such as to select a lower number of fingerprints, i.e., filter the database knowing there should be a finite set of stored fingerprints associated with that locale. It may be that this indexing is a function of a fixed ID wireless device—beacon—being disposed within the locale of the transaction block 1806 or it could be trained such that the fingerprints of wireless devices in the locale of the transaction block 1806 were transmitted and indexed via a training operation. In any event, by receiving this information, less fingerprints can be provided that are known fingerprints to be at that location just by recognizing one or more known wireless devices characteristics/unique information. The program then flows to a function block 2008 to receive the stored fingerprints to which the current fingerprint is to be compared. The program then flows to a function block 2010 to compare fingerprints, and then to a function block 2012 in order to send the compare results back to the main program Referring now to FIG. 21, there is illustrated a diagrammatic view of the comparison operation for fingerprints. A first fingerprint, a current fingerprint, is illustrated with five different wireless devices illustrating the signal strengths. As noted here and above, they are also providing characteristics such as the MAC address, identification name, etc., that might be retrieved from each of these wireless devices. Of the five wireless devices, there are two that never show up in the stored fingerprints. This may be for the reason that there were two other wireless devices that were mobile and were either moved into the locale or were merely turned on and had never been seen before by another device collecting or scanning for these fingerprints or wireless devices.

There are illustrated three stored fingerprints. The first stored fingerprint, FP A, illustrates three matches wherein the other two show four matches, these being the stored fingerprints FP B and FP C. Each of these has slightly different received signal strength. However, the FP C has the closest match, and that could be verification that it in fact matches one of these fingerprints. This basically represents a set of fingerprints that had been involved with other transactions.

Take the example wherein transactions were conducted and the first five people to make the transaction were allowed to go through without a requirement of a fingerprint match. However, they generated a fingerprint during the transaction which was stored. This fingerprint was stored in association with the transaction. Because the transaction occurred, the server knew that these fingerprints were taken at those locations. It could be that these first five transactions were valid transactions, i.e., there was no indication that fraud was involved. There was no requirement for a fingerprint to have been provided, but it was provided for these five. There may have been another five or ten transactions which did not have the ability to transmit a fingerprint and did not do so. The reason for this is that they may not have had a mobile device running the particular application associated with this operation. Even if all of the mobile devices involved in fingerprint augmented transactions provided a fingerprint, these could be used for the process of verification as this would provide a higher level of confidence in the verification process. One goal of this system is to detect spoofing such that there is some presence required at a locale in order to complete the transaction.

Although the preferred embodiment has been described in detail, it should be understood that various changes, substitutions and alterations can be made therein without departing from the spirit and scope of the invention as defined by the appended claims.

What is claimed is:

1. A method for authenticating a user transaction based upon scanned wireless signals comprising:
receiving a wireless fingerprint from a location where a mobile unit is in proximity to a transaction being conducted by a user at the location;
determining if the received wireless fingerprint matches a stored wireless fingerprint associated with the location;
receiving unique user verification information specific to the transaction; and
verifying the received unique user verification information and authorizing the transaction if the received wireless fingerprint matches one or more stored wireless fingerprints associated with the location in a fingerprint database, and the unique user verification information is verified.

2. The method of claim 1, further comprising the step of generating the wireless fingerprint proximate in time to the time of conducting the transaction.

3. The method of claim 2, further comprising generating the wireless fingerprint by the mobile unit.

4. The method of claim 2, wherein the transaction is conducted on a transaction unit a the location.

5. The method of claim 4, further comprising generating the wireless fingerprint by the transaction unit.

6. The method of claim 2, wherein the step of generating the wireless fingerprint includes the steps of:
scanning the environment about the location for the presence of wireless devices broadcasting identification information; and
accumulating the characteristics of each of the scanned wireless devices as an accumulated wireless fingerprint in association with the time of scanning and accumulating.

7. The method of claim 6, wherein one of the scanned wireless devices is in a fixed relationship with the scanning location and is part of at least one of the stored fingerprints and associated with the location such that the presence of the fixed wireless device in a received fingerprint provides a strong indication of the presence of the mobile device and the transaction being conducted at the location.

8. The method of claim 6, wherein one of the stored fingerprints comprises a reference fingerprint that is closely associated with the location and a substantial match of the received fingerprint with the reference fingerprint allows the transaction to be verified.

9. The method of claim 1, the step of verifying occurs at a server, the database disposed at the server.

10. The method of claim 9, wherein the mobile device has identifying information associated therewith and the transaction is conducted by a transaction device and further comprising initiating the transaction by the user with the transaction device and interfacing the mobile unit with the transaction device to transfer the mobile unit identifying information to the transaction device such that the server is made aware of the presence of the mobile unit in the transaction.

11. The method of claim 10, further comprising the server contacting the mobile unit in the event that the step of verifying fails.

12. The method of claim 11, further comprising the step of inputting a PIN by the user via the mobile unit when notified of the verification failure and them completing the transaction.

13. The method of claim 1, and further comprising the step of completing the transaction.

* * * * *